(12) United States Patent
Nishiyama et al.

(10) Patent No.: US 6,454,527 B2
(45) Date of Patent: Sep. 24, 2002

(54) NOISE REDUCTION MECHANISM OF FAN DEVICE AND MOLDING METHOD OF POROUS DAMPING MATERIAL THEREFOR

(75) Inventors: Toshihiko Nishiyama; Kengo Koshimizu, both of Oyama; Mitsuo Yabe, Hirakata, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/771,932

(22) Filed: Jan. 30, 2001

(30) Foreign Application Priority Data

Jul. 31, 2000 (JP) ........................................ 2000-231152

(51) Int. Cl.[7] .............................................. F04D 29/66
(52) U.S. Cl. ...................... 415/119; 415/173.1; 264/51
(58) Field of Search .............................. 415/119, 173.1, 415/170.1; 264/321, 342 R, 51

(56) References Cited

U.S. PATENT DOCUMENTS

| 3,321,931 A | * | 5/1967 | Lehmkuhl | 123/41.49 |
| 3,799,128 A | * | 3/1974 | Small | 123/41.9 |
| 3,947,148 A | * | 3/1976 | Holt | 415/119 |
| 3,976,393 A | * | 8/1976 | Larson | 415/119 |
| 5,199,846 A | * | 4/1993 | Fukasaku et al. | 415/119 |
| 5,709,175 A | * | 1/1998 | Carrol | 123/41.49 |
| 5,736,075 A | * | 4/1998 | Lee et al. | 264/28 |

FOREIGN PATENT DOCUMENTS

| GB | 967100 | * | 8/1964 |
| JP | 64-13229 | | 1/1989 |
| JP | 2-39956 | | 3/1990 |

OTHER PUBLICATIONS

Patent Abstract of Japan, Publication No. 56–41119, dated Apr. 16, 1981. Discussed in the specification.
Patent Abstract of Japan, Publication No. 57–126524, dated Aug. 6, 1982. Discussed in the specificaton.

* cited by examiner

*Primary Examiner*—Edward K. Look
*Assistant Examiner*—Igor Kershteyn
(74) *Attorney, Agent, or Firm*—Armstrong, Westerman & Hattori, LLP.

(57) ABSTRACT

Porous damping material (40) is attached to an entire inner circumference of the fan shroud (20) opposing to an end of a fan (4) and is exposed to opposing space without using conventional perforated metal. Accordingly, jet noise caused by strong swirl between the fan (4) and the fan shroud (20) can be damped by the damping material (40) and impulsive sound scarcely occurs. Thus, both of the impulsive sound and the jet noise can be effectively damped, thereby securely reducing noise. The pours member (401) constituting the porous damping material (40) is a die-molding product made by a die (150) having a cavity (153).

24 Claims, 36 Drawing Sheets

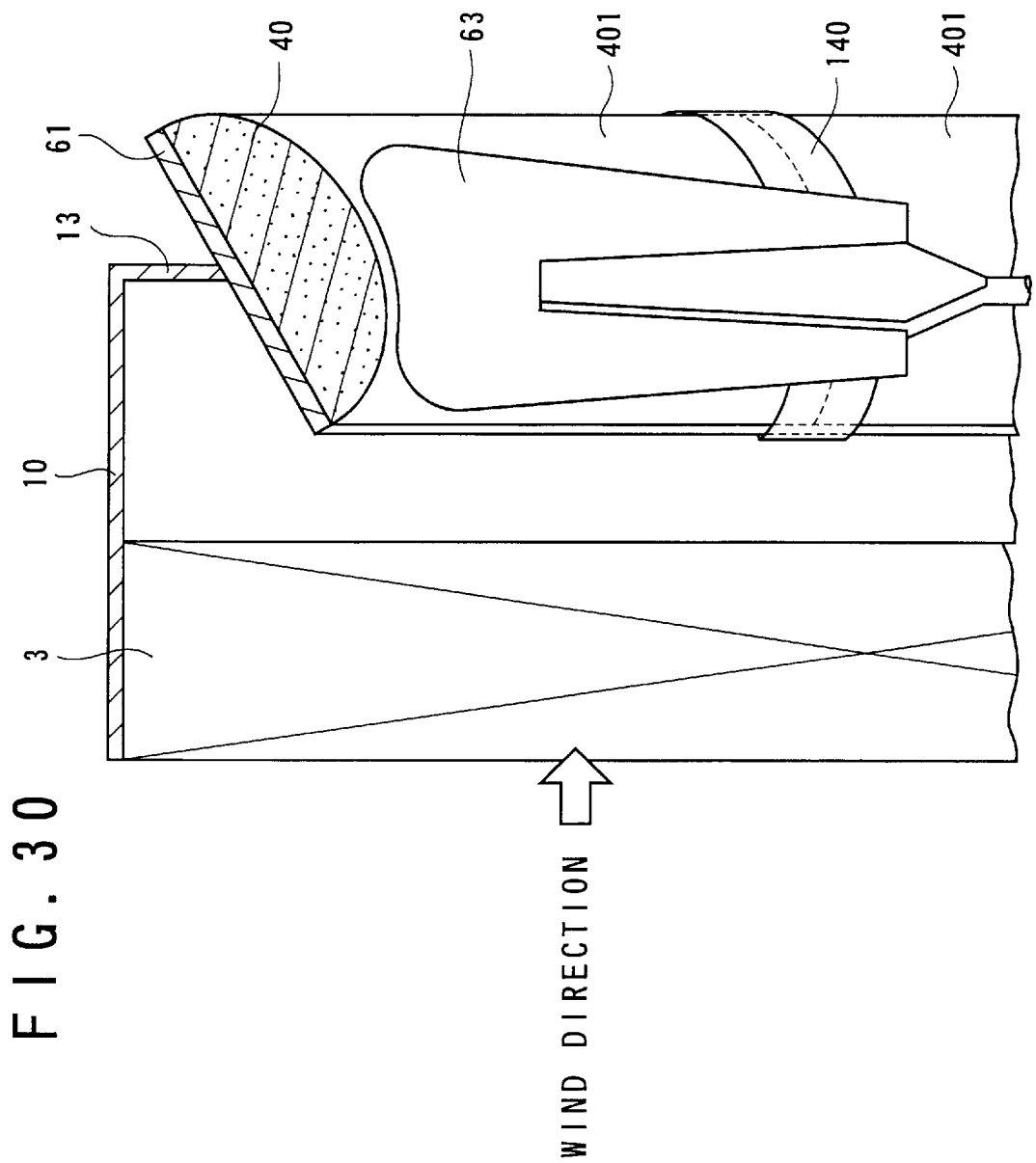

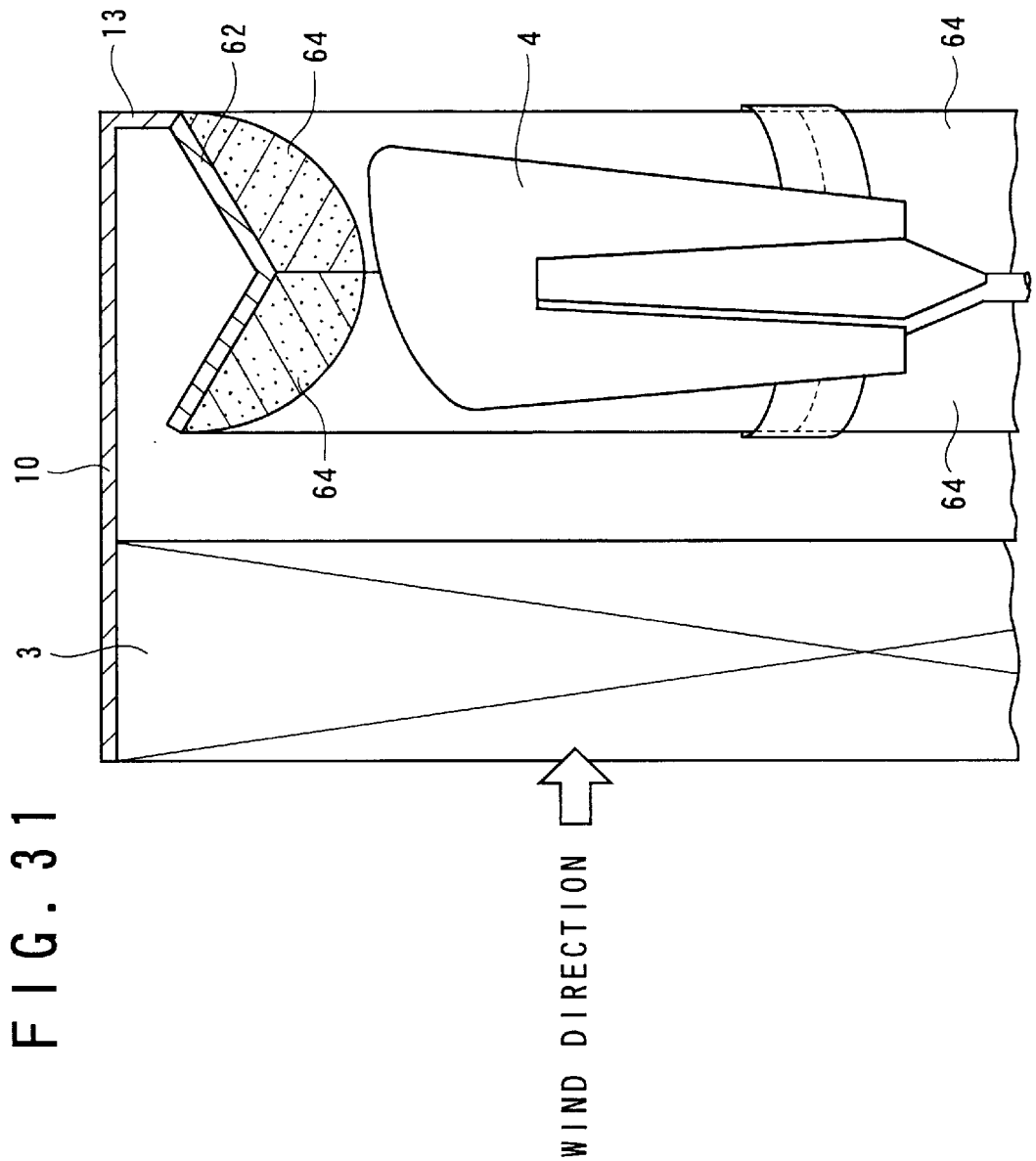

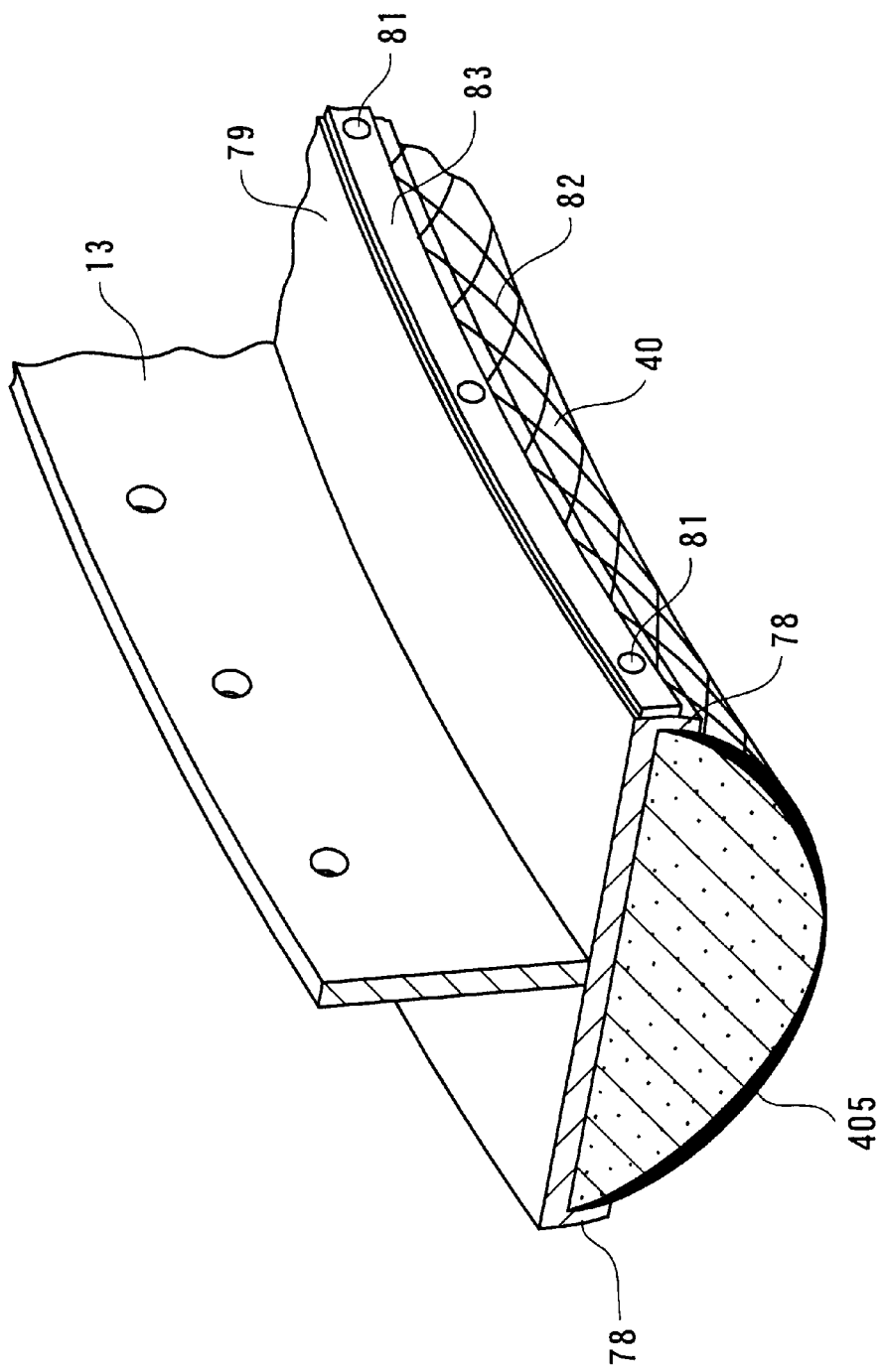

NOISE REDUCTION MECHANISM OF FAN DEVICE AND MOLDING METHOD OF POROUS DAMPING MATERIAL THEREFOR

BACKGROUND OF THE INVENTION

1. Field of the Invention

The present invention relates to a noise reduction mechanism of a fan device and a molding method of porous damping material used therefor. More specifically, it relates to a noise reduction mechanism of a fan device used for engine cooling system of special-purpose vehicle including construction equipment such as excavator and other vehicles, and industrial cooling system.

2. Description of Related Art

Conventionally, in an engine cooling system of vehicles, coolant is circulated between the engine and radiator. In such cooling system, a fan is attached proximal to the radiator, so that heat is exchanged between cooling air sucked in by the fan and the coolant in the radiator to cool the engine by the coolant after heat exchange.

In the above, a fan shroud is provided around the fan to straighten flow of the cooling air passing through the radiator, thus enhancing heat exchange by the radiator to improve cooling efficiency of the engine.

A strong swirl is generated at a slight gap between an end of the fan and the fan shroud in accordance with rotation of the fan, which causes jet noise. For reducing the jet noise, it is disclosed in Japanese Utility Model Laid-Open Publication No. Sho 56-41119, Japanese Utility Model Laid-Open Publication No. Sho 57-126524, Japanese Utility Model Laid-Open Publication No. Sho 64-13229 and Japanese Utility Model Laid-Open Publication No. Hei 2-39956 (including microfilm of respective application in the publication) to provide a noise damper to the fan shroud.

All of the noise dampers disclosed in the publications have opposing surface of the fan shroud opposing the end of the fan formed of hard perforated metal with a lot of through-holes being drilled, so that the jet noise can be reduced by the damping material and energy damping space provided further outer side of the perforated metal.

However, according to the noise damper disclosed in the publications, since the perforated metal is used at the portion where the strong swirl is generated, high-frequency impulsive sound can be generated by an impact caused when the cooling air bumps into step portion of the through-holes of the perforated metal. Accordingly, though the noise damper can reduce the jet noise, the impulsive sound can be newly generated, thus being unable to effectively reduce the overall noise.

SUMMARY OF THE INVENTION

An object of the present invention is to provide a noise reduction mechanism of a fan device capable of effectively damp both the impulsive sound and the jet noise caused by the swirl, thus effectively reduce the noise.

The noise reduction mechanism of fan device according to the present invention attains the above object by changing material of the member proximal and opposing to the end of the fan and/or structure around the fan (fan shroud).

Specifically, A noise reduction mechanism of fan device according to the present invention includes: a fan shroud spaced apart from a rotation locus of an end of a rotary fan by a predetermined gap; a shroud support for supporting the fan shroud; and a porous damping material opposing to the end of the fan, the porous damping material being attached to at least a part of the fan shroud or forming a part of the fan shroud.

In the present description, the word "porous" refers to a material having porosity, i.e. sponge-like material, which is different from the perforated metal having a number of holes drilled by press working.

In the present invention, since the porous damping material is attached to the surface (inner circumference) of the fan shroud opposing to the end of the fan to which the strong swirl is generated by pasting, or the surface of the fan shroud opposing to the end of the fan itself is made of the porous damping material, the jet noise caused by the swirl can be damped by sound absorbing properties of the porous damping material.

Further, since the conventional perforated metal is not used, the cooling air does not bump into the hard step portion, thus being unlikely to generate impulsive sound.

Accordingly, both of the impulsive sound and the jet noise can be effectively damped and the noise between the end of the fan and the fan shroud can be securely decreased.

The noise reduction mechanism of fan device according to the present invention may preferably have a radiator provided to upstream or downstream of the fan, a radiator hood and an end plate, the radiator hood and the end plate air-tightly connecting the radiator and the fan shroud.

According to the above arrangement, since the airtight space surrounded by the radiator hood and the end plate works as a damping space of the energy (pressure wave) of the noise, damping properties can be improved. Further, since the radiator hood is provided, the cooling air can flow more smoothly, so that the radiator can exchange the heat more efficiently.

In the above noise reduction mechanism of fan device, another porous damping material may preferably be attached to inner circumference of the radiator hood and/or inner circumference of the end plate.

Accordingly, since the porous damping material is attached to the inner circumference of the radiator hood and the end plate, the noise can be further decreased.

In the noise reduction mechanism of fan device according to the present invention, a number of holes may preferably be formed to the fan shroud with the porous damping material being attached.

Accordingly, low-frequency noise can be effectively decreased by forming the number of holes to the fan shroud.

In the noise reduction mechanism of fan device according to the present invention, the fan shroud and/or the porous damping material may preferably have bell-mouth shape.

According to the above arrangement, since the fan shroud and/or the porous damping material have bell-mouth shape, the cooling air can flow smoothly between the end of the fan and the fan shroud or the porous damping material, so that the generated jet noise can be reduced to further decrease the noise.

In the above, the porous damping material may have a cover portion for covering a surface thereof opposing to the end of the fan.

Accordingly, since the surface of the porous damping material is covered with the cover portion, absorption of water can be more securely prevented as compared to chemical water-repellant treatment on the surface of the porous damping material. Further, since the dust snapped by the fan does not-bump into the porous portion of the porous damping material, the porous damping material can be prevented from being degraded and damaged, so that weather resistance and durability can be improved.

Furthermore, since firmness of the porous damping material can be improved by the cover portion and the porous damping material is less likely to be flexed, the porous damping material is more easily attached to the fan shroud by, for instance, pasting, thus facilitating manufacture of the fan shroud.

In the noise reduction mechanism of fan device according to the present invention, the fan shroud may preferably have a protector for protecting at least one of upstream end and downstream end of the porous damping material in an air flow direction.

When the porous damping material is attached to the fan shroud, the upstream and downstream end of the porous damping material can be easily peeled off from the fan shroud by collision with the dust snapped by the fan. However, since the protector can prevent the collision of the dust, the porous damping material can be effectively prevented from being peeled off.

In the above, the fan shroud may preferably have an engage member for partially engaging the porous damping material.

Accordingly, since the engage member can maintain the attachment of the porous damping material, the porous damping material can be prevented from being peeled off from the fan shroud, thus improving reliability.

The fan shroud may have openings respectively provided on upstream and downstream side in the air flow direction and curved in bell-mouth shape, and a parallel portion provided between the openings, the parallel portion being parallel to the axis line direction of rotation axis of the fan, and the porous damping material may be attached to the parallel portion of the fan shroud.

Accordingly, since the parallel portion of the fan shroud forms the cylindrical portion having the same inner diameter, the porous damping material can be attached to the cylindrical portion. Therefore, it is not necessary that the porous damping material is pressed to the curved portion for attachment, thus facilitating attachment work.

In the above, the porous damping material may preferably formed in a smooth shroud extending over a part of the bell-mouth curved portion provided to upstream and downstream side in the air flow direction.

According to the above arrangement, since a part of the opening having the bell-mouth shape (i.e. a part of the bell-mouth configuration) is formed by the porous damping material, even when the portion made of the fan shroud itself is shortened by the length of the portion made of the porous damping material, the entire bell-mouth configuration can be maintained while keeping width dimension (width in a direction parallel to the axis line) of the porous damping material. Accordingly, the size of the fan shroud can be reduced by the length of the shortened opening by the fan shroud while securely maintaining the noise absorbing properties.

A noise reduction mechanism of fan device according to another aspect of the present invention includes: a fan shroud spaced apart from a rotation locus of an end of a rotary fan by a predetermined gap; a radiator provided on upstream or downstream of the fan; a radiator hood and an end plate for air-tightly connecting the radiator and the fan shroud; and a damping chamber constituted of semi-closed space surrounded by the radiator hood, the end plate and the fan shroud, the damping chamber being in communication with an inside of the radiator hood through a plurality of resonance pipe provided along circumferential direction of the damping chamber.

According to the above arrangement, the porous damping material attached to the fan shroud can decrease the noise composed of jet noise and impulsive sound and the noise can be further reduced by forming the semi-closed damping chamber.

In addition, since the damping chamber and the inside of the radiator hood are intercommunicated by the resonance pipe, a resonance frequency at the resonance pipe can be defined by appropriately setting diameter and length of the resonance pipe, volume of the damping chamber etc., so that noise having the same specific frequency as the resonance frequency is resonated in the resonance pipe, thus efficiently damping the noise energy.

Incidentally, in the above-described present invention, the porous damping material is attached to an inner circumference of the fan shroud (i.e. a portion confronting the rotation locus of the end of the fan) for effectively damp the jet noise caused between the fan shroud and the fan, thus securely reducing noise.

The porous damping material is, for instance, formed in a desired shape such as square cross section and size by cutting a large foamed urethane resin by a hot wire or a cutting machine having thin blade. The porous damping material having material flexibility is attached to the fan shroud of various shapes considering fan performance such as bell-mouth shape.

However, a lot of trouble is required for cutting the porous damping material into a desired shape by the above-described cutting machine.

Further, it is not economical to form the fan shroud into a shape considering the fan performance such as the bell-mouth shape. This is because, for instance, when the fan shroud is made of metal, great die cost is necessary on account of large size press die and, when the fan shroud is made of resin, the size of the molding die is enlarged and cost thereof is significant.

Another object of the present invention is to provide a noise reduction mechanism of fan device capable of being easily and economically manufactured.

In order to attain the above object, the noise reduction mechanism of fan device of the present invention employs the porous damping material made of die molding.

Specifically, a noise reduction mechanism of fan device according to the present invention has: a rotary fan; a fan shroud spaced apart from a rotation locus of an end of the rotary fan by a predetermined gap; a shroud support for supporting the fan shroud; and a porous damping material opposing to the end of the fan, the porous damping material being attached to at least a part of the fan shroud or forming a part of the fan shroud, the porous damping material being a die-molding product.

According to the above arrangement, since the porous damping material is a die-molding product, desired final shape of porous damping material can be easily obtained. Further, since the porous damping material can be easily molded in any shape considering fan performance such as bell-mouth shape, the fan shroud may be configured in a simple shape considering convenience in manufacture, so that conventionally required large press die or molding die is no longer necessary.

In the noise reduction mechanism of fan device according to the present invention, the porous damping material may preferably be formed linearly in a longitudinal direction thereof and may preferably be curved along the circumference of the fan shroud.

According to the above arrangement, the porous damping material may be molded in a linear elongated shape and cut into any desired length, so that the porous damping material can be easily applied to fan shrouds having different diameter.

In the noise reduction mechanism of fan device according to the present invention, the porous damping material may preferably be curved in a longitudinal direction thereof and be provided along the circumference of the fan shroud.

According to the above arrangement, the porous damping material may be molded in a curved shape in accordance with the diameter of the fan shroud, so that the porous damping material can be easily attached.

In the noise reduction mechanism of fan device according to the present invention, the porous damping material may preferably be constituted of a plurality of porous member provided along the circumference of the fan shroud.

According to the above arrangement, since the porous damping material is composed of the plurality of short porous member, the size of the die required for molding can be reduced, thus decreasing die cost. Further, since the porous member is short, transportation and storage thereof can be facilitated.

In the noise reduction mechanism of fan device according to the present invention, a configuration of the porous damping material confronting the end of the fan may preferably be a bell-mouth shape on both upstream side and downstream side of the fan shroud.

According to the above arrangement, the frequency of the fan can be lowered corresponding to increase in wind flow, thus further reducing noise.

In the noise reduction mechanism of fan device according to the present invention, the porous damping material may preferably be held on the fan shroud and/or the support by a belt-shaped dropout prevention means.

According to the above arrangement, the porous damping material is securely held by the dropout prevention means and, since the dropout prevention means is belt-shaped, the dropout prevention means may be wound around the porous damping material or the fan shroud, thus facilitating attachment work.

In the noise reduction mechanism of fan device according to the present invention, the porous damping material may preferably be held on the fan shroud and/or the support by a net-shaped dropout prevention means.

According to the above arrangement, the porous damping material can be also securely held by the dropout prevention means. Further, since the dropout prevention means is net-shaped, the entire porous damping material can be securely held, thus greatly improving dropout prevention effect.

On the other hand, since the porous damping material directly confronts the fan, the porous damping material can be deteriorated or damaged by colliding with dust or rainwater snapped by the fan, thus deteriorating weather-resistance and durability of the porous damping material.

Accordingly, the resin sheet or the cloth sheet made of various material is attached on the surface of the porous damping material by adhesion or thermal bonding to prevent the surface of the porous damping material from foreign body, thus improving weather-resistance and durability.

However, attachment work of the resin sheet or the cloth sheet onto the surface of the porous damping material by adhesion or thermal bonding is not easy and requires a lot of work, thus deteriorating productivity.

Further object of the present invention is to improve weather-resistance and durability of porous damping material used for the noise reduction mechanism of fan device.

In order to attain the above object, the present invention employs molding method of the porous damping material by die-molding.

Specifically, according to the present invention, a molding method of a porous damping material used for a noise damping mechanism of a fan device having: a rotary fan; a fan shroud spaced apart from a rotation locus of an end of the rotary fan by a predetermined gap; a shroud support for supporting the fan shroud; and a porous damping material opposing to the end of the fan, the porous damping material being attached to at least a part of the fan shroud or forming a part of the fan shroud, the method is characterized in having the steps of: disposing a foam material having larger volume than a cavity of a die while being elastically deformed; and heating the die to mold the foam material into the porous damping material.

The "cavity" referred herein is a portion having a volume of a final configuration of the porous damping material.

According to the above arrangement, since the foam material is disposed in the cavity while being compressed, the contact area against the cavity surface is enlarged on the surface of the foam material on account of dense foam. When the die is heated under the above condition, the heat is efficiently transmitted to the dense portion, so that the surface of the foam material is securely melted to securely mold the final configuration of the porous damping material. At this time, thin rigid layer is easily formed on the surface of the foamed material, which efficiently functions as a protection layer. Accordingly, the porous damping material can be effectively protected from the dust and rainwater snapped by the fan, thus improving weather-resistance and durability.

In the molding method of the porous damping material according to the present invention, the porous damping material may preferably be constituted of a plurality of porous member provided along the circumference of the fan shroud, the porous damping material being molded by the foam material using the die.

As mentioned above, according to the above arrangement, since the size of the die required for molding can be reduced, thus reducing die cost and facilitating transportation and storage of the porous member.

BRIEF DESCRIPTION OF THE DRAWINGS

FIG. 30 is a cross section showing the thirteenth modification of the resent invention;

FIG. 31 is a cross section showing the fourteenth modification of the present invention;

FIG. 36 is a perspective showing the twentieth modification of the present invention.

DETAILED DESCRIPTION OF PREFERRED EMBODIMENT(S)

[First Embodiment]

First embodiment of the present invention will be described below with reference to attached drawings.

Figure 1:
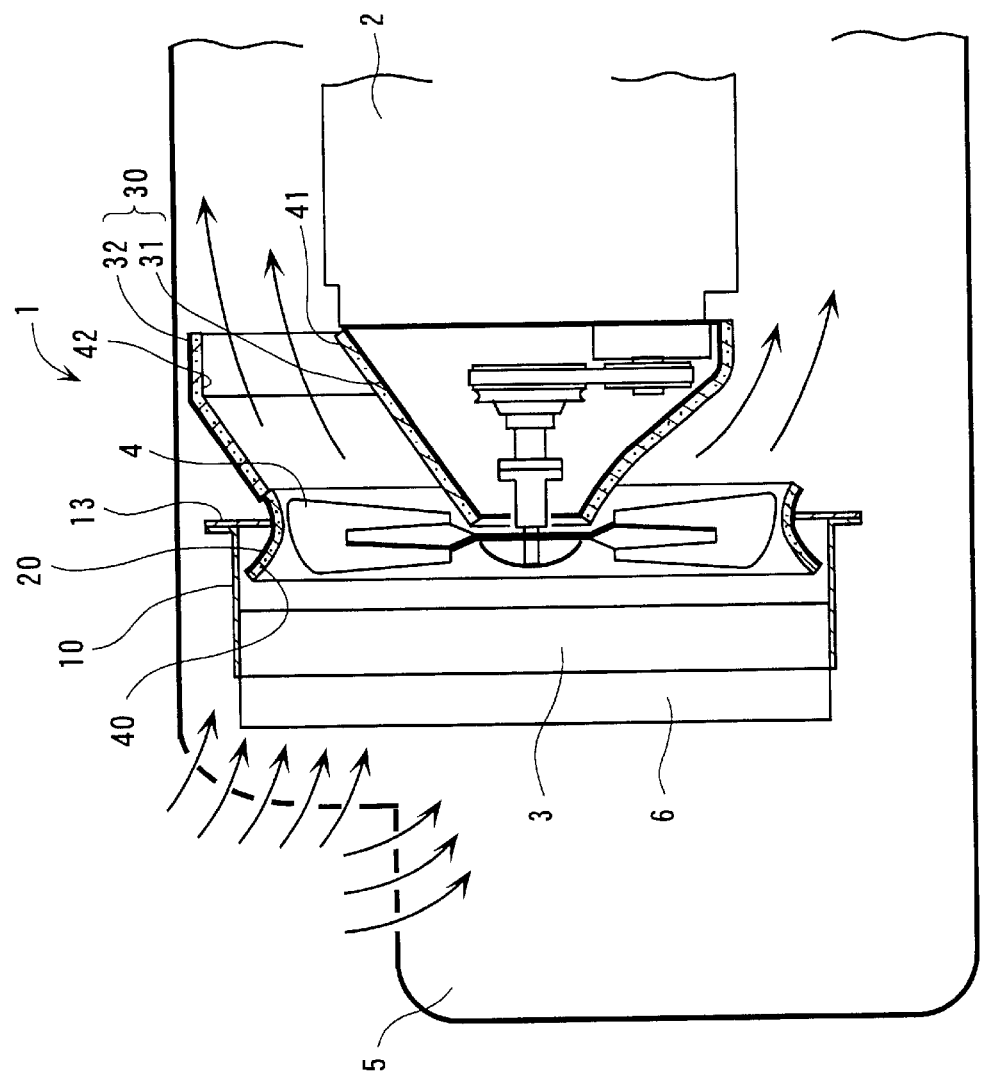
FIG. 1 is an entire view schematically showing the noise reduction mechanism of fan device according to first embodiment.
Figure 2:
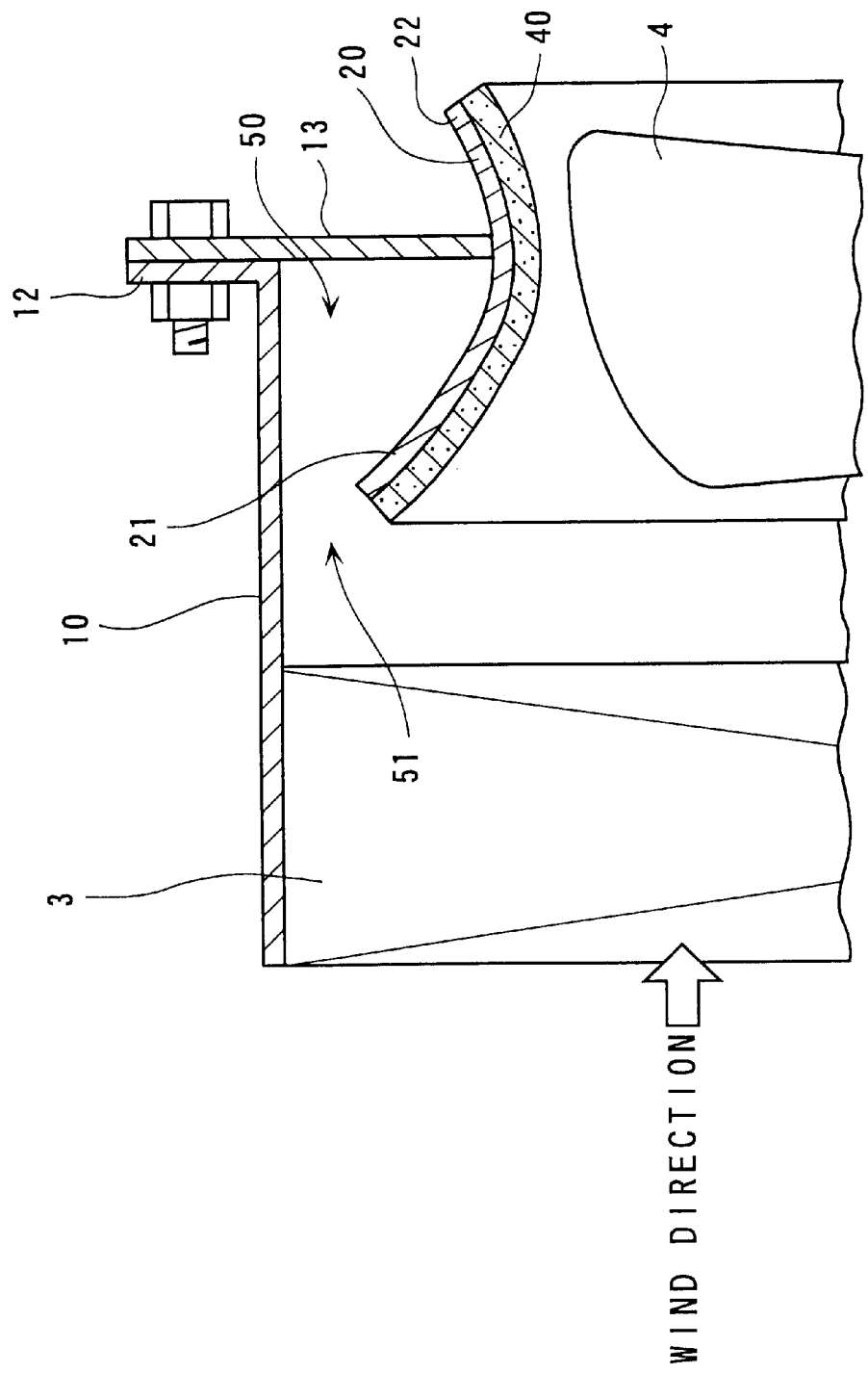
FIG. 2 is an enlarged cross section showing a primary portion of second embodiment according to the present invention.

FIG. 1 is an entire view schematically showing the noise reduction system of fan device according to the first embodiment applied to an engine cooling system 1 of construction equipment such as excavator, and FIG. 2 is an enlarged view showing primary portion of the noise reduction mechanism.

The engine cooling system 1 circulates coolant between an engine 2 and a radiator 3 and cools the engine 2 by the coolant whose heat is exchanged by the radiator 3. A fan 4 for sucking in cooling air for heat exchange from the outside is disposed between the engine 2 and the radiator 3, the fan 4 being rotated by power transmitted from a crank shaft of the engine 2 through a pulley and a fan belt.

An oil cooler 6 is disposed on further upstream side (upstream side of the cooling air flow direction) of the radiator 3 (see FIG. 1) and engine oil is circulated between a hydraulic circuit of a hydraulic machinery (not shown) and the oil cooler 6, so that the engine oil whose heat is exchanged by the oil cooler 6 cools and lubricates the engine 2. However, the oil cooler 6 may be provided as necessary.

A radiator hood 10, a fan shroud 20 and a cover hood 30 respectively made of sheet metal are disposed on the downstream side of the radiator 3. The cover hood 30 is composed of an engine cover 31 covering the above-described pulley and fan belt and semicircle-base shaped outer cover 32 provided above the engine cover 31, these members forming flow channel of the cooling air.

The radiator hood 10 is configured in a square pipe and partial cylinder having an outer fringe 12 provided to a downstream end thereof, and is fixed to the radiator 3 by bolts and nuts at upstream side thereof. A flat perpendicular end plate 13 is fixed to the outer fringe 12 by bolts and nuts, and the cylindrical fan shroud 20 is fixed to a large opening provided at the center of the end plate 13 by welding etc. In short, the end plate 13 shuts the gap between the radiator hood 10 and the fan shroud 20 and also works as a shroud support for supporting the fan shroud 20.

The fan shroud 20 is spaced apart from a rotation locus of the end of the fan 4 by a predetermined gap, and is composed of an upstream opening 21 being open in a bell-mouth shape toward upstream side and a downstream opening 22 being open in a bell-mouth shape toward downstream side with the end plate 13 approximate border thereof. The bell-mouth configuration of the respective openings 21 and 22 allows smooth flow of the cooling air between the end of the fan 4 and the fan shroud 20.

As shown in enlarged illustration of FIG. 2, a porous damping material 40 made of synthetic resin such as foamed urethane resin and polyethylene terephtalate (PET) is attached to inner circumference of the fan shroud 20 without using perforated metal and is exposed on substantially the whole surface while keeping the bell-mouth configuration of the fan shroud 20, thus reducing jet noise and impulsive sound caused between the end of the fan 4 and the fan shroud 20. In the present embodiment, the damping material 40 is one of the significant features as the noise reduction mechanism of the present invention.

Surface of the damping material 40 is water-repellant by chemical treatment etc., thus protecting the surface from rainwater sucked in with the cooling air to improve weather resistance of the damping material 40.

In the fan shroud 20, the upstream opening 21 extends wider than the downstream opening 22 to be open to inside of the radiator hood 10. Upstream peripheral end of the upstream opening 21 is proximal to inner circumference of the radiator hood 10 having the square pipe and partial cylindrical configuration at four sections (four sections of up, down, right and left viewing from the front) in circumferential direction.

As a result, the space surrounded by the radiator hood 10, the end plate 13, the upstream opening 21 of the fan shroud 20 intercommunicates with the inside of the radiator hood 10 through the gap 51 (see FIG. 2), thus forming substantially closed damping chamber 50. The damping chamber 50 is also one of significant features as the noise reduction mechanism of the present invention.

On the other hand, damping materials 41 and 42 are attached to the outside of the engine cover 31 and inside of the outer cover 32 constituting the cover hood 30 (see FIG. 1), thus reducing jet noise of the cooling air passing through the fan shroud 20. Incidentally, the cover hood 30 is not requisite for the present invention, which may be provided as necessary.

In the present embodiment, the fan 4 is driven by the engine 2 to suck in the cooling air from the outside of the engine room 5 as shown in arrow in FIG. 1.

The sucked cooling air passes through the oil cooler 6 to exchange heat with the hydraulic oil of the hydraulic machinery and, subsequently, passes through the radiator 3 to exchange heat with the coolant. Thereafter, the sucked cooling air is sent to the engine 2 sequentially through the radiator hood 10, the fan shroud 20 and the cover hood 30 and is finally discharged to the outside of the engine room 5.

At this time, the noise in accordance with the rotation of the fan 4 is reduced by the damping chamber 50 in the radiator hood 10 and by damping materials 40 to 42 in the fan shroud 20 and the cover hood 30.

According to the above-described embodiment, following effects can be obtained.

1) Since the porous damping material 40 is attached to the whole inner circumference of the fan shroud 20 opposing to the end of the fan 4 while being exposed to the opposed space, the jet noise caused by the strong swirl between the fan 4 and the fan shroud 20 can be damped by the damping material 40.
2) Since the conventional perforated metal is not used, the cooling air does not bump into the hard step portion, thus unlikely to cause impulsive sound.
3) Both of the impulsive sound and the jet noise in accordance with the rotation of the fan 4 can be effectively damped by the above 1) and 2), thus securely reducing the noise between the end of the fan 4 and the fan shroud 20.
4) The upstream opening 21 of the fan shroud 20 extends proximal to the inside of the radiator hood 10 and the space surrounded by the upstream opening 21, the radiator hood 10 and the end plate 13 forms the substantially closed damping chamber 50 in communication with the inside of the radiator hood 10 through the small gap 51. Accordingly, the damping effect of the damping chamber 50 can be enhanced and the noise can be more securely reduced since the noise energy (pressure wave) transmitted from the fan 4 to the upstream can be largely damped in the damping chamber 50, thus more securely reducing the noise.
5) Since the fan shroud 20 is open to both of the upstream side and the downstream side in bell-mouth shape, the cooling air can flow smoothly between the end of the fan 4 and the fan shroud 20, thus enhancing damping effect of the noise.
6) Since the damping materials 41 and 42 are attached to the cover hood 30 disposed to the downstream side of the fan 4 to be exposed to the flow channel of the cooling air, the noise energy transmitted from the fan 4 to the downstream can be damped by the damping materials 41 and 42, thus further reducing the noise.
7) Since the surface of the damping materials 40, 41 and 42 is water-repellant on account of chemical treatment or the like, the damping materials 40, 41 and 42 are less likely to be significantly degraded by water such as rain sucked with the cooling air, thus improving weather resistance of the damping materials 40, 41 and 42.
8) Since the cooling air can be smoothly sucked in because the radiator hood 10 is disposed between the radiator 3 and the fan shroud 20, the heat exchange by the oil cooler 6 and the radiator 3 can be enhanced and the cooling efficiency of the engine 2 can be improved.

Further, since the cooling water can smoothly flow to the engine 2 by providing the cover hood 30, the cooling air can be further efficiently sucked in.

Other preferred embodiments of the present invention will be described below with reference to attached drawings. Incidentally, the same reference numeral is attached to the same or corresponding components as the above-described first embodiment to omit or simplify the description thereof. Further, the portions not illustrated in the drawings have the same configuration as the first embodiment and the description thereof is omitted.

[Second Embodiment]

Figure 3:
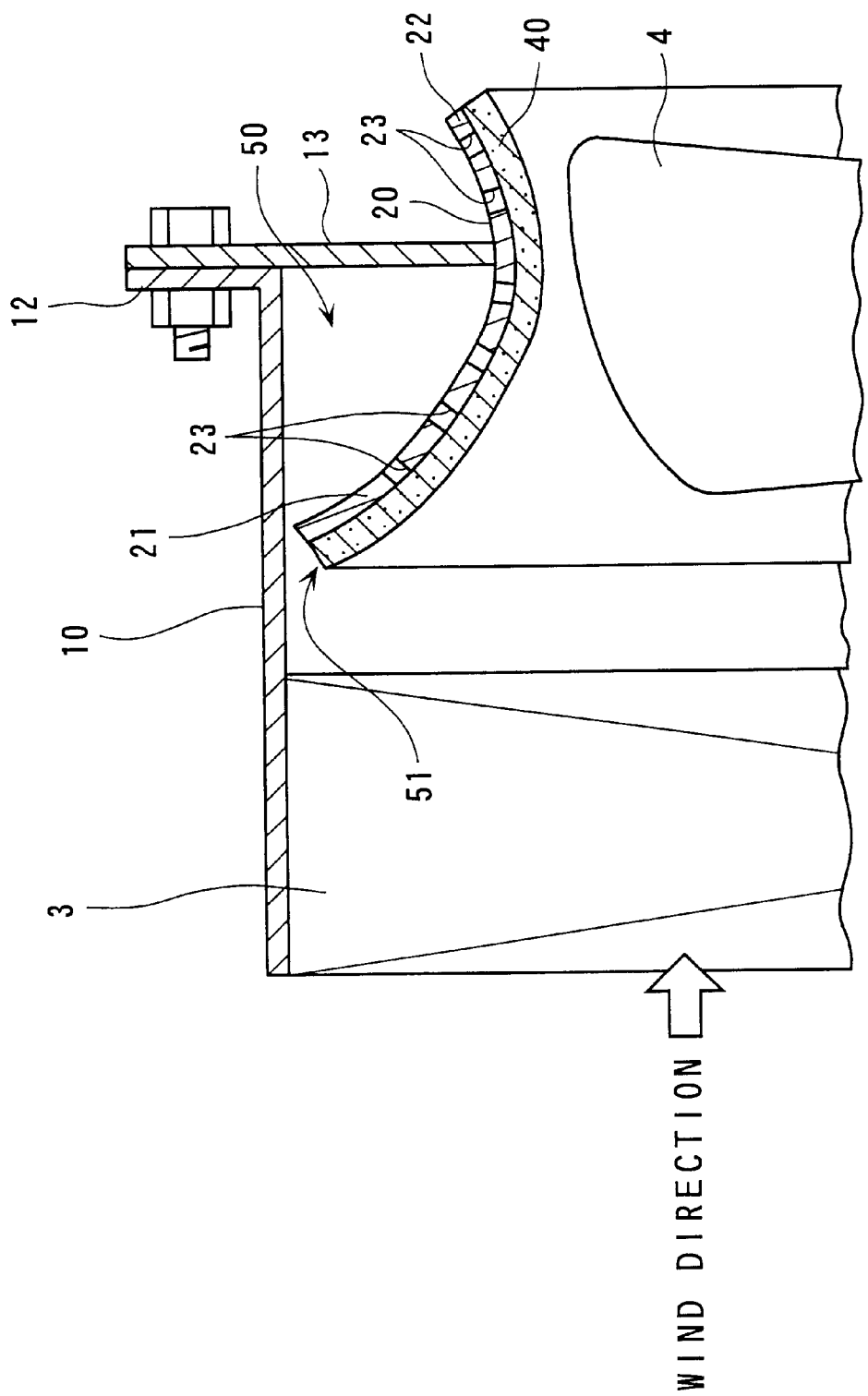
FIG. 3 is an enlarged cross section showing a primary portion of second embodiment according to the present invention.

FIG. 3 schematically shows a primary portion of the noise reduction mechanism of fan device according to second embodiment of the present invention.

The present embodiment differs from the first embodiment in that a number of holes 23 is drilled to the fan shroud 20 and that the upstream opening 21 of the fan shroud 20 is brought further proximal to the inside of the radiator hood 10 to improve degree of enclosure of the damping chamber 50.

According to the present embodiment, following effects can be obtained as well as the effects 1) to 8) of the first embodiment.

9) Since the number of holes 23 is drilled to the fan shroud 20, low-frequency noise of the noise generated during rotation of the fan 4 that easily transmits through the damping material 40 can be reduced by the upstream opening 21. This is because the low-frequency noise can be effectively damped by the holes 23 and the damping chamber 50 in communication with the holes 23 when the low-frequency noise reaches the fan shroud 20.

[Third Embodiment]

Figure 4:
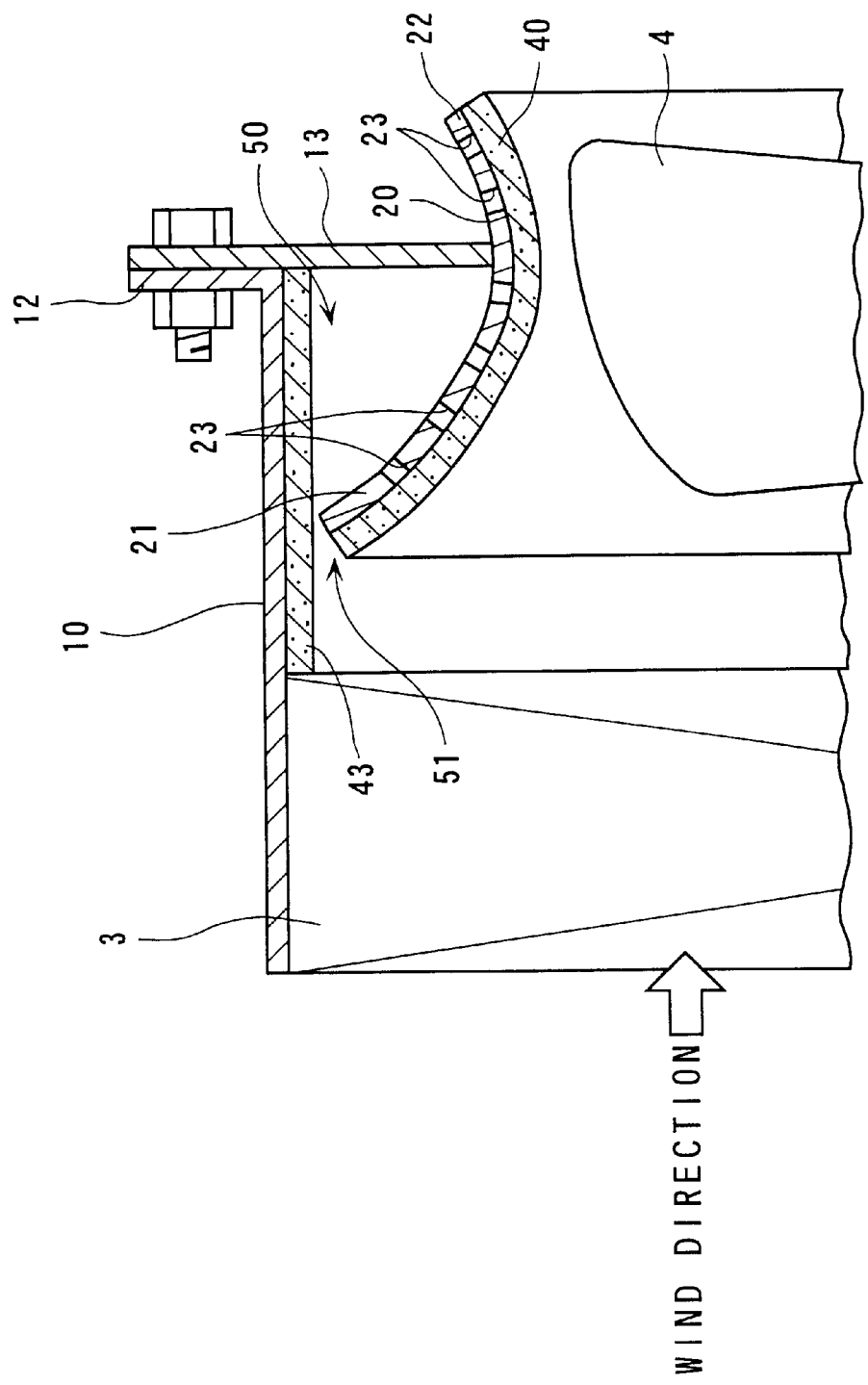
FIG. 4 is an enlarged cross section showing a primary portion of third embodiment according to the present invention.

FIG. 4 shows the third embodiment of the present invention, where damping material 43 is attached to the whole inner circumference of the radiator hood 10 in addition to the arrangement of the second embodiment.

According to the present embodiment, following effect as well as the above effects 1) to 9) can be obtained.

10) The noise can be damped at a larger area on the upstream side of the fan 4 by the damping material 43 attached to the inside of the radiator hood 10, thus enhancing damping effect.

[Fourth Embodiment]

Figure 5:
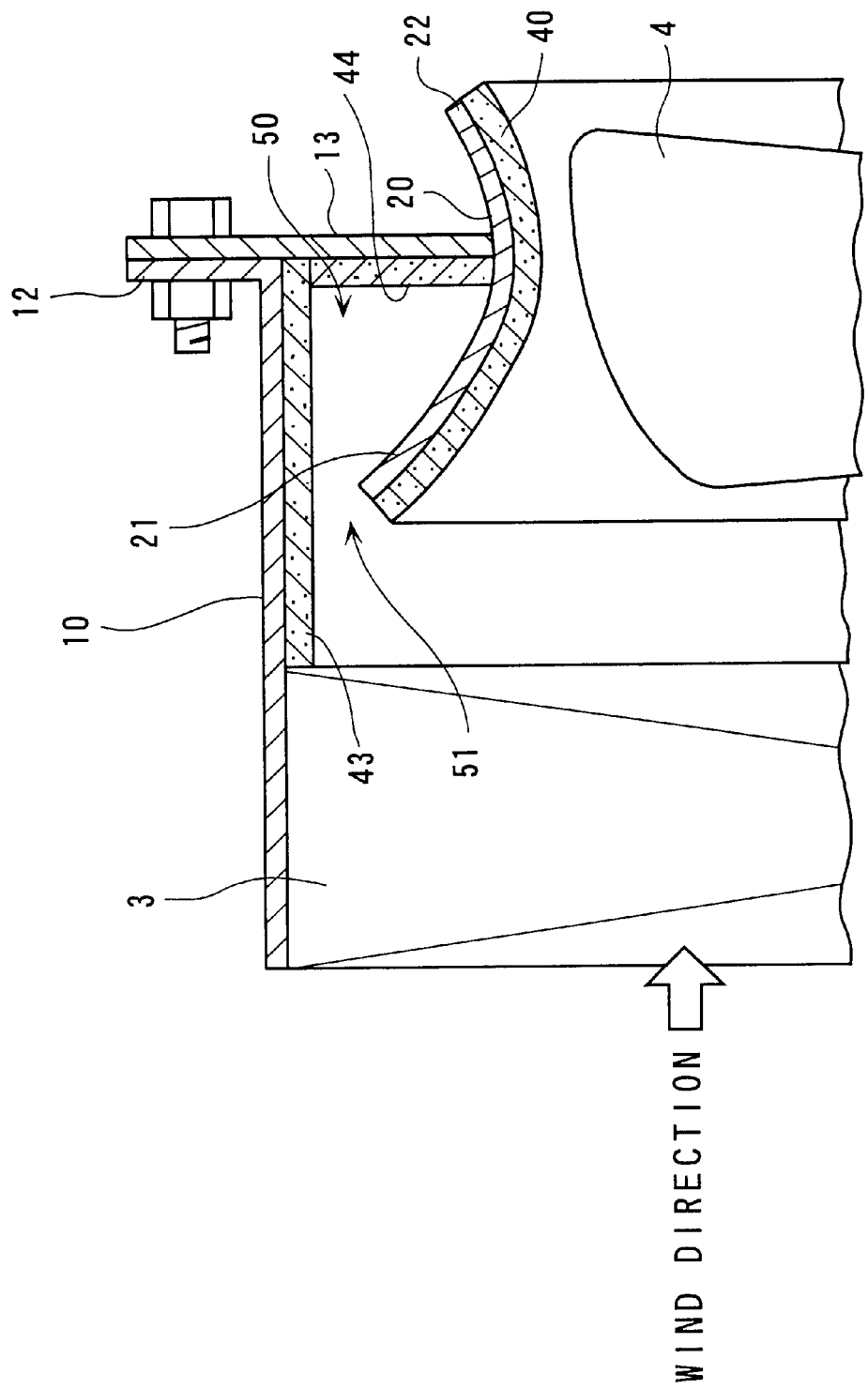
FIG. 5 is an enlarged cross section showing a primary portion of fourth embodiment according to the present invention.

FIG. 5 shows fourth embodiment of the present invention, where damping material 44 is attached to the whole inner circumference of the radiator hood 10 and inside of the end plate 13 in addition to the arrangement of the first embodiment. Incidentally, the damping material 43 attached to the radiator hood 10 and the damping material 44 attached to the end plate 13 may be independently provided or integrally formed.

When the respective damping materials 43 and 44 are independently provided, the members 10 and 13 can be connected after the damping materials 43 and 44 are attached to the radiator hood 10 and the end plate 13 respectively. When the damping materials are integrated, the damping materials 43 and 44 can be attached after the respective members 10 and 13 are assembled.

According to the present embodiment, following effect as well as the effects 1) to 8) and 10) can be obtained.

11) Since the damping material 44 is attached to the inner circumference of the end plate 13, the noise can be damped by approximate entire area of the inside of the radiator hood 10, thus further enhancing the damping effect. Further, since an inner circumference of the damping chamber 50 is formed by a large surface from which the damping material 44 is exposed, the noise can be effectively damped in the damping chamber 50.

[Fifth Embodiment]

Figure 6:
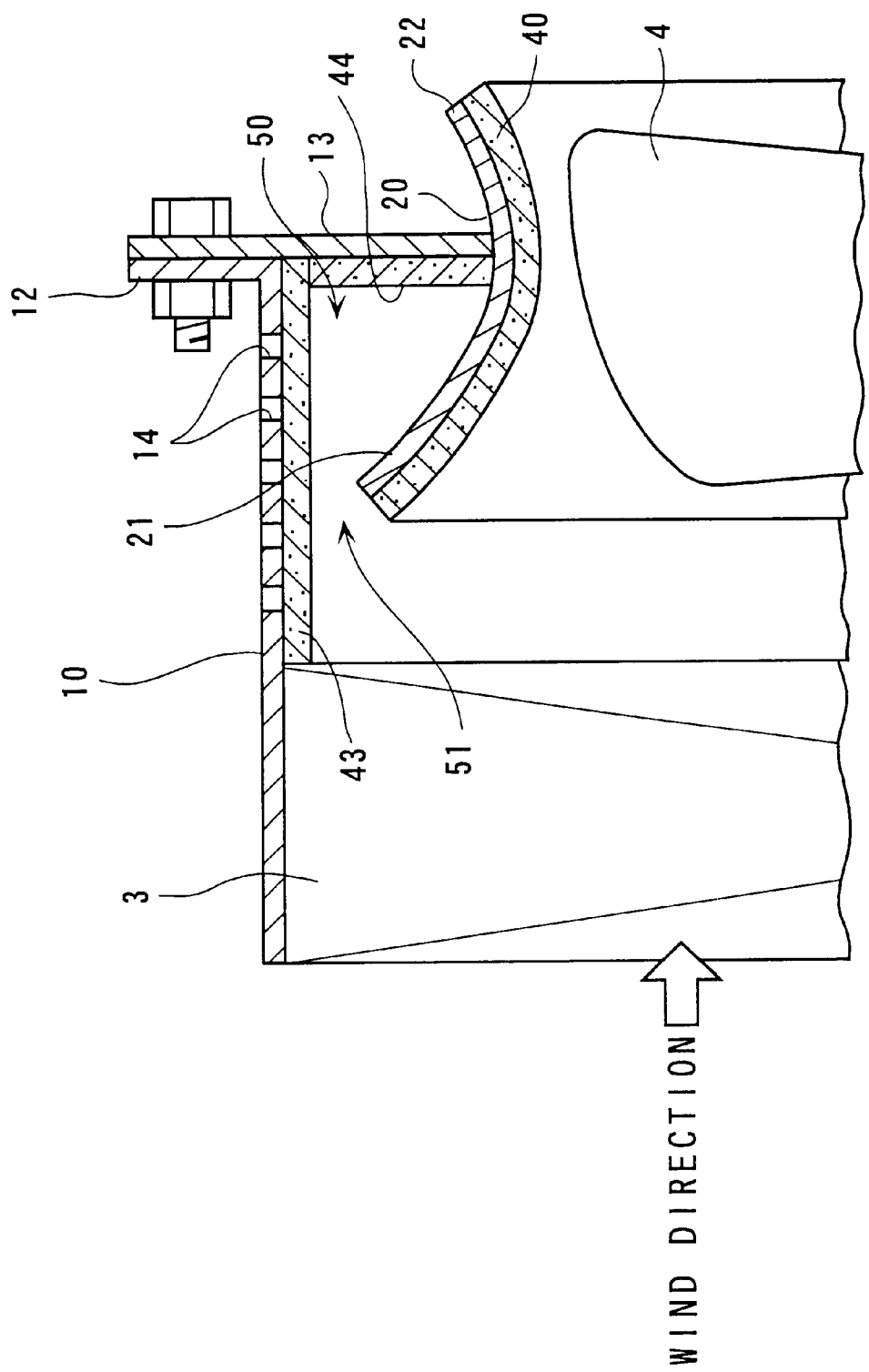
FIG. 6 is an enlarged cross section showing a primary portion of fifth embodiment according to the present invention.

FIG. 6 shows the fifth embodiment of the present invention, where hole 14 is drilled to circumference of the radiator hood 10 in addition to the arrangement of the fourth embodiment.

According to the present embodiment, following effect as well as the effects 1) to 8), 10) and 11) can be obtained.

12) The low-frequency noise can be further damped at a larger upstream side of the fan 4 by the hole 14 drilled on the radiator hood 10.

[Sixth Embodiment]

Figure 7:
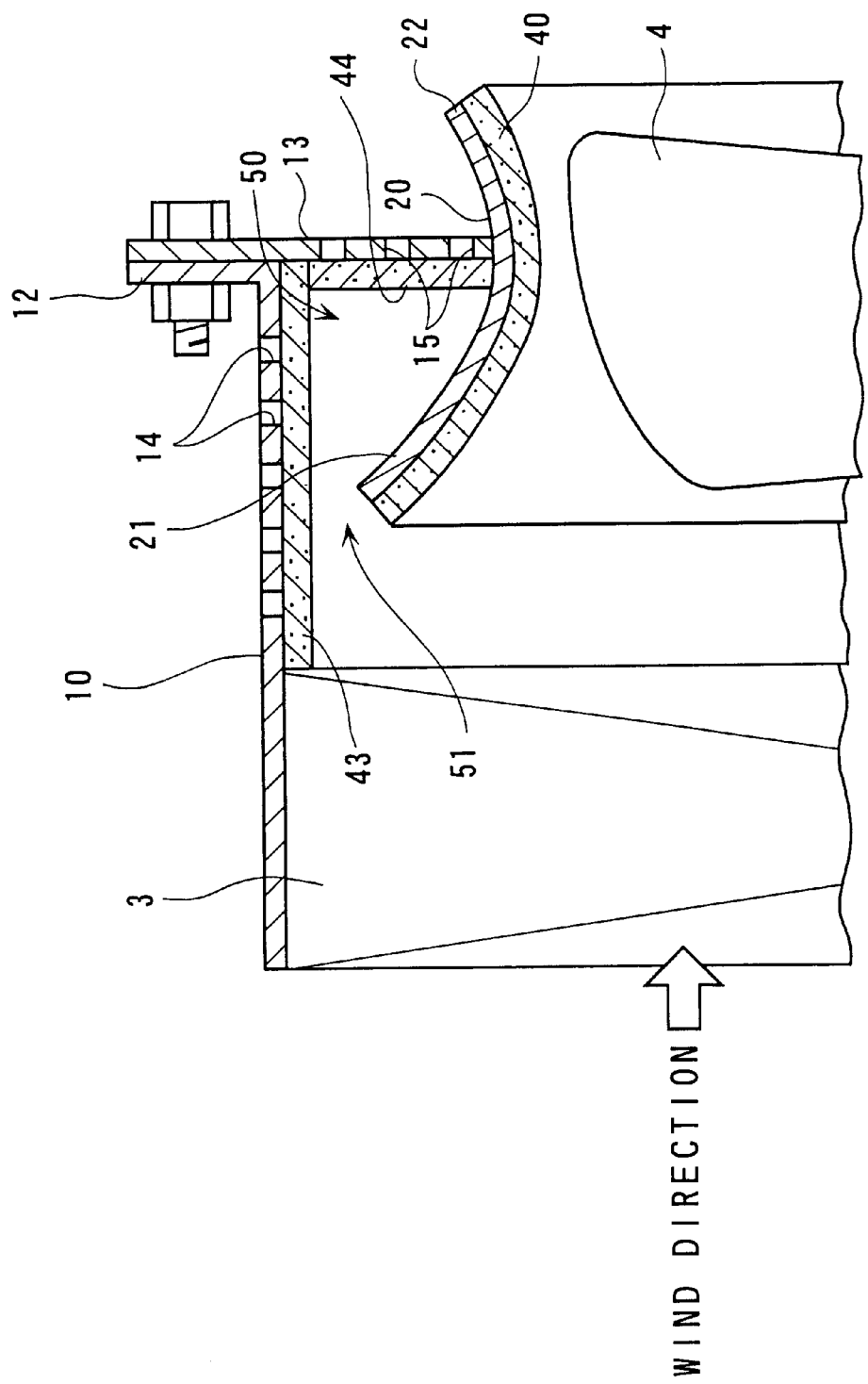
FIG. 7 is an enlarged cross section showing a primary portion of sixth embodiment according to the present invention.

FIG. 7 shows the sixth embodiment of the present invention, where hole 15 is drilled to the end plate 13 in addition to the arrangement of the fifth embodiment.

According to the present embodiment, following effects as well as the effects 1) to 8), and 10) to 12) can be obtained.

13) The low-frequency noise can be further damped at substantially the whole upstream side of the fan 4 by the hole 15 drilled to the end plate 13, especially in the damping chamber 50.

[Seventh Embodiment]

Figure 8:
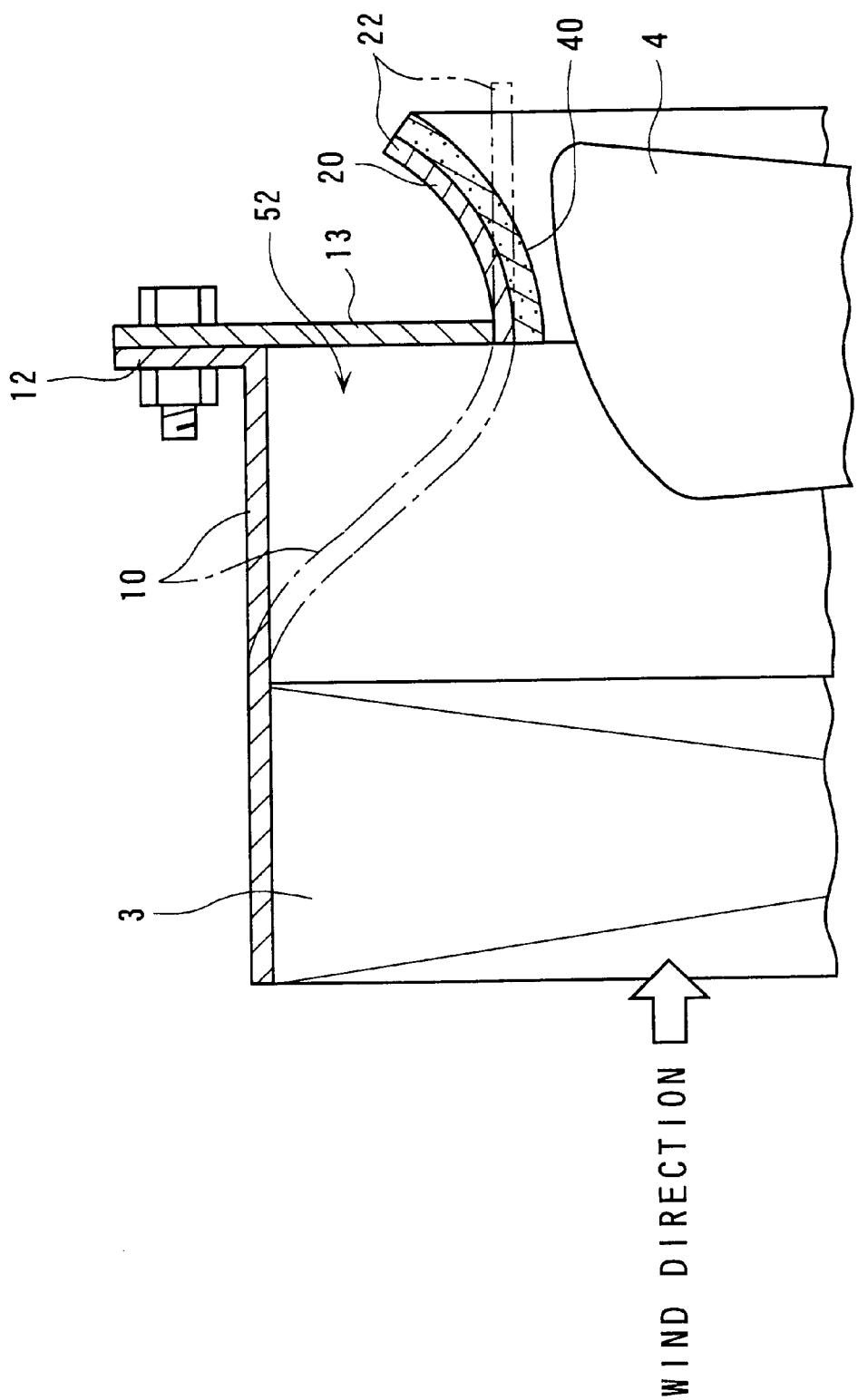
FIG. 8 is an enlarged cross section showing a primary portion of seventh embodiment according to the present invention.

FIG. 8 shows the seventh embodiment of the present invention.

The present embodiment differs from the first embodiment in that the fan shroud 20 is composed only of the downstream opening 22. Accordingly, the fan shroud 20 does not extend to the inside of the radiator hood 10 and the damping chamber 50 (see FIGS. 2 to 7) is not provided.

According to the present embodiment, since the fan shroud 20 is composed only of the downstream opening 22 and the damping chamber 50 is not provided, the effects 4) and 5) among the effects of 1) to 8) of the first embodiment can not be sufficiently achieved.

However, the noise can be damped to some degree by a space 52 surrounded by the radiator hood 10 and the end plate 13. Incidentally, the end plate 13 may be omitted and the radiator hood 10 may be formed in bell-mouth shape to be consecutive with the fan shroud 20 as shown in single dotted line in FIG. 8, for the fan shroud 20 not extend to the inside of the radiator hood 10.

Since the downstream opening 22 has bell-mouth shape, the cooling air can flow more smoothly as compared to an arrangement where the fan shroud 20 extends horizontally toward the downstream as shown in double-dotted line in FIG. 8 or an arrangement where the opening linearly widens toward downstream, thus damping the noise.

[Eighth Embodiment]

Figure 9:
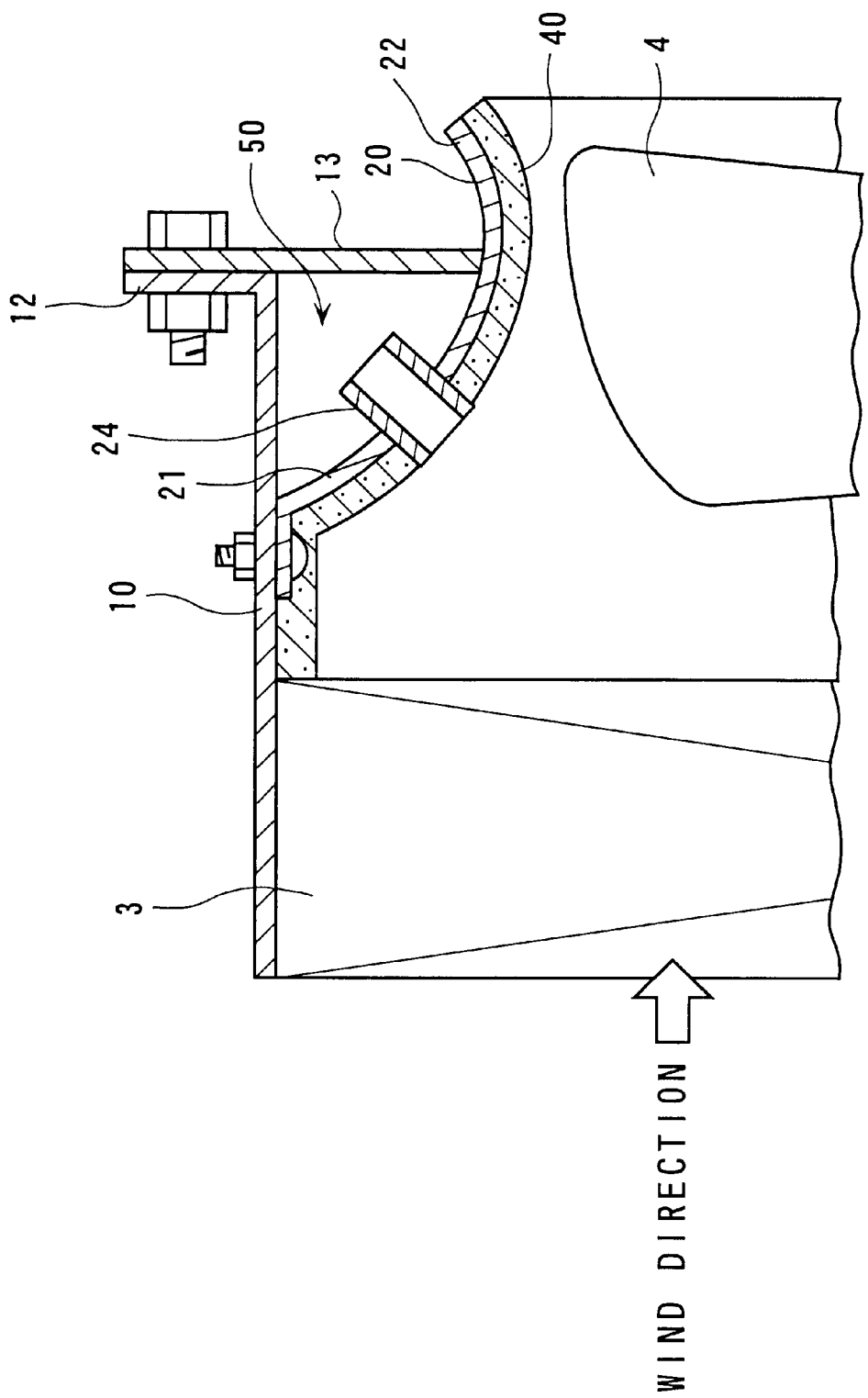
FIG. 9 is an enlarged cross section showing a primary portion of eighth embodiment according to the present invention.

FIG. 9 shows the eighth embodiment of the present invention.

The present embodiment differs from the first embodiment in that upstream peripheral end of the upstream opening 21 of the fan shroud 20 is connected on the whole circumference of the inside of the radiator hood 10 and a plurality of resonance pipe 24 is provided along the circumferential direction of the upstream opening 21. Accordingly, the damping chamber 50 is semi-closed and is in communication with the inside of the radiator hood 10 only by the plurality of the resonance pipe 24.

According to the present embodiment, following effect as well as the effects 1) to 8) of the first embodiment can be obtained.

14) Since the inside of the radiator hood 10 is in communication with the inside of the damping chamber 50 by the plurality of the resonance pipe 24, diameter, length, volume etc. of the resonance pipe 24 can be appropriately determined to define the resonance frequency of the resonance pipe 24, so that the noise having the same specific frequency as the resonance frequency can be resonated by the resonance pipe, thus efficiently damping the noise energy and improving the damping effect.

Further, since the damping chamber 50 is semi-closed, the damping effect in the damping chamber can be further improved.

[Ninth Embodiment]

Figure 10:
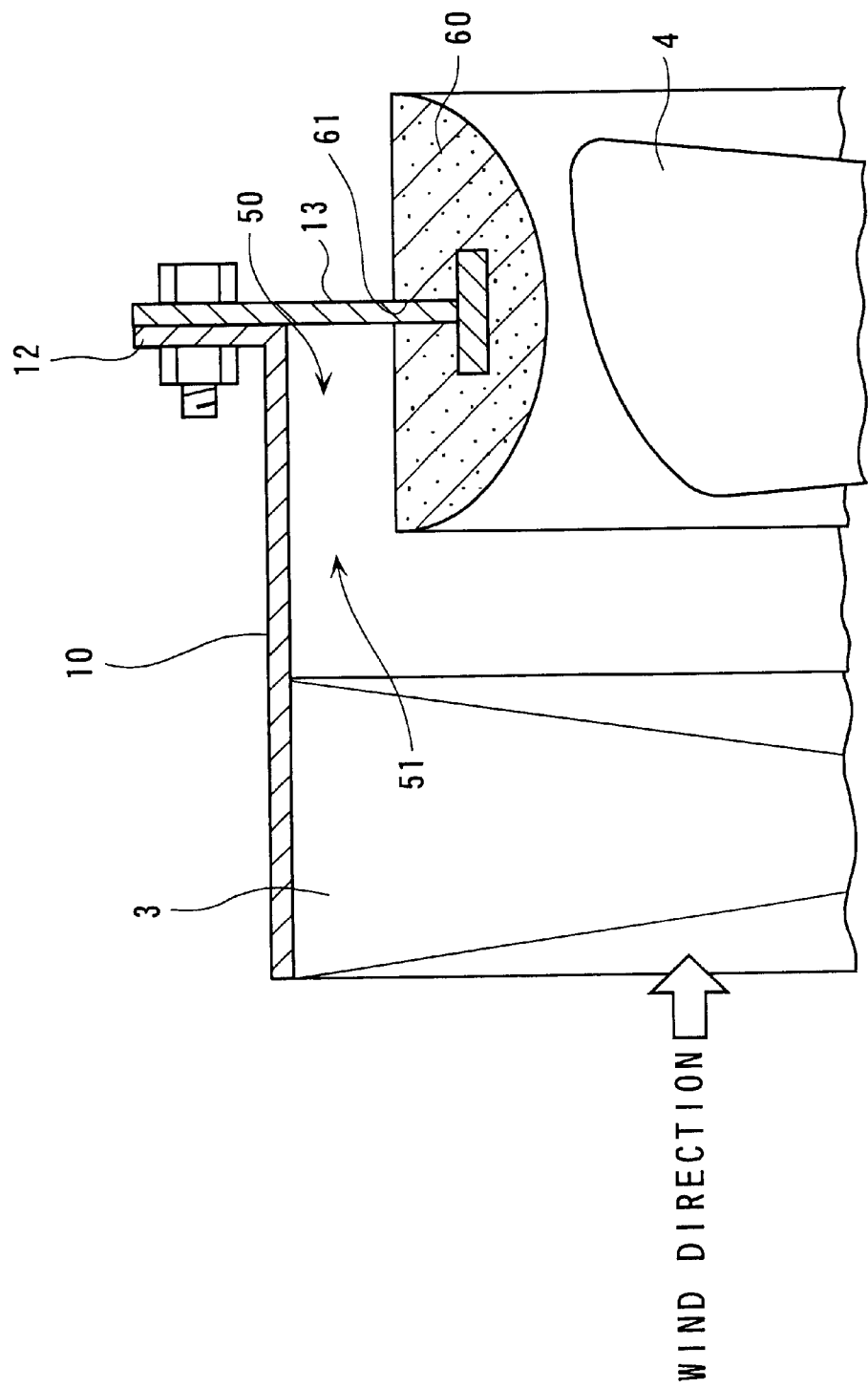
FIG. 10 is an enlarged cross section showing a primary portion of ninth embodiment according to the present invention.

FIG. 10 shows the ninth embodiment of the present invention.

In the present embodiment, fan shroud 60 itself is formed of a porous damping material and the surface opposing the end of the fan 4 is formed in a bell-mouth shape. A slit 61 being cut to the inside is provided to the outer circumference of the fan shroud 60 and an inner periphery of the end plate 13 having reverse T-shape cross section (T-shape cross section in the down side) is inserted to the slit 61 and the fan shroud 60 is fixed to the end plate 13 by adhesion or the like. The other arrangement is the same as the first embodiment.

In the present embodiment, since the fan shroud 60 itself is made of porous damping material, the effects 1) to 3) described in the first embodiment can be similarly obtained and the object of the present invention can be attained. Further, when the fan shroud 60 is configured into, for instance, crescent shape to get the upstream periphery closer to the inner circumference of the radiator hood 10, the degree of enclosure of the damping chamber 50 is increased and the aforesaid effect 4) can be obtained. Further, effects 5) to 8) can be obtained by the similar arrangement.

[Tenth Embodiment]

The tenth embodiment will be described below with reference to FIG. 11.

Fan shroud 70 according to the present embodiment has the end plate 13 consecutively formed at an end thereof and the entire shroud is contained in the radiator hood 10.

The upstream side and the downstream side of the fan shroud 70 are upstream opening 71 and downstream opening 72 being open in curved bell-mouth shape, the upstream opening 71 and the downstream opening 72 being connected to a parallel portion 73 being parallel (parallel in cross section) to the axis line of rotation axis (not shown) of the fan 4. The parallel portion 73 is formed by an inner circumference of a recessed groove 74 provided consecutively along the circumferential direction of the fan shroud 20.

A porous damping material 80 is disposed in the recessed groove 74. Surface of the porous damping material 80 opposing the fan 4 is a flat portion 81 parallel to the parallel portion 73 and substantially consecutive with the surface of openings 72 and 73 on both sides. Upstream and downstream end portion 82 of the damping material 80 is covered with elevational portion 75 of the recessed groove 74, so that dust drawn into the fan shroud 20 does not bump into the end portion 82 of the damping material 80 even when the dust is snapped by the fan 4. In other words, the elevational portion 75 of the recessed groove 74 forms a protector of the present invention.

As in the above-described damping material 40, the damping material 80 is made of synthetic resin such as urethane resin and polyethylene terephtalate and has a layered cover portion 83 on the flat portion 81 side.

Material of the cover portion 83 is selected from resin sheet of acrylic resin, cloth sheet woven from polyester resin fiber or aluminum glass fiber etc. considering influence on damping ability of the damping material 80 and required weather resistance and durability, and the selected material is adhered or thermally bonded to the damping material 80. The cover portion 83 is superior in water-proofness to water-repellant processing of the surface of the damping material 80 and is harder than the porous portion of the damping material 80 and has enough strength not to be easily damaged by collision with the dust snapped by the fan 4.

Thickness of the cover portion 83 is 10 to 200 μm, for instance, in engine cooling system of construction equipment, though different from the material of the cover portion 83 and the damping material 80 and the required characteristic.

Incidentally, the parallel portion 73 of the damping material 80 itself may be treated by chemical or heat to form the layered cover portion (cover layer) having approximately the same thickness. Further, the cover portion according to the present invention may be completely exposed to the fan 4 side or, alternatively, may be formed on a middle layer portion adjacent to the exposed surface.

Following effects as well as the above-described effects 1) to 5), 10) and 11) can be obtained according to the present embodiment.

15) Since the surface of the damping material 80 is superior in water-proofness and is covered with the cover portion 83 having superior strength, absorption of rainwater sucked into the fan shroud can be securely prevented and the damping material 80 does not easily break by collision against the dust snapped by the fan 4, thus preventing the dust from directly bumping into the porous portion of the damping material 80. Accordingly, degradation and damage of the damping material 80 on account of water and dust can be prevented, thus improving weather resistance and durability.

16) Since the cover portion 83 is hard to some extent, firmness of the damping material 80 can be improved, thus making the damping material 80 difficult to be flexed. Accordingly, the damping material 80 can be easily fitted into the recessed groove 74 of the fan shroud 70, thus facilitating production of the fan shroud 20.

17) Since it is only necessary that the damping material 80 is attached to the flat parallel portion 73 of the recessed groove 74, the damping material 80 is unlikely to be partially detached as compared to attaching the damping material to a curved surface, so that the damping material 80 can be securely and easily attached to the parallel portion 73, thus facilitating production of the fan shroud 20.

18) Since the damping material 80 is disposed in the recessed groove 74 of the fan shroud 70 and the upstream and downstream end portion 82 of the damping material 80 is concealed by the elevational portion 75 of the recessed groove 74, the end portion 82 can be prevented from peeled off from the fan shroud 70, thus further improving the durability of the damping material 80.

19) Since the surface opposing the end of the fan 4 is the flat portion 81 parallel to the axis line direction, gap (tip clearance) of the narrow area between the fan 4 and the damping material 80 can be set wider in width direction of the damping material 80 as compared to an arrangement where the whole damping material 80 is curved. Accordingly, since the damping material 80 is proximal to the end of the fan 4 in large area in the width direction, the jet current in accordance with the swirl can be efficiently damped, thus improving damping effect.

[Eleventh Embodiment]

Figure 12:
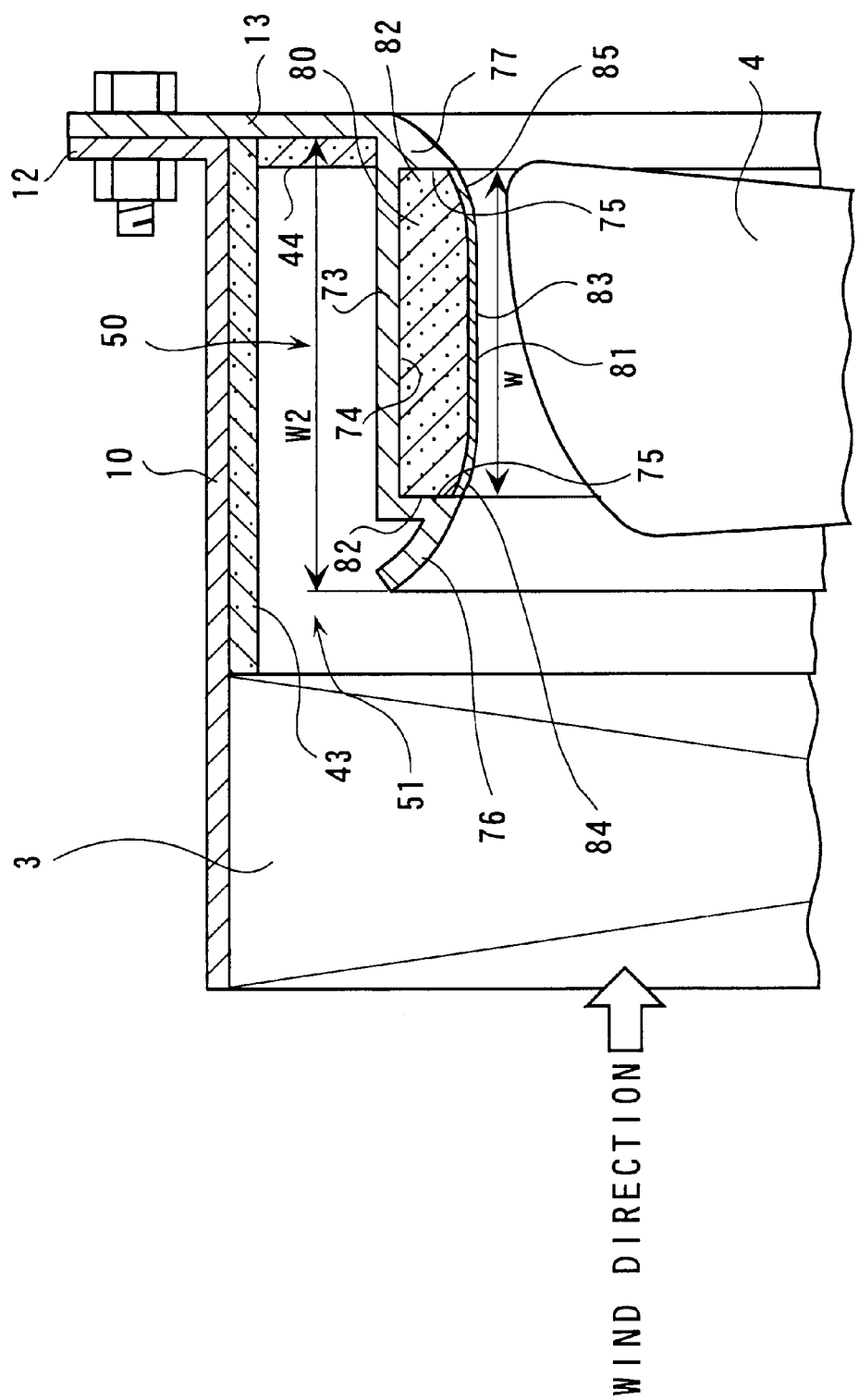
FIG. 12 is an enlarged cross section showing a primary portion of eleventh embodiment according to the present invention.

The eleventh embodiment will be described below with reference to FIG. 12.

Figure 11:
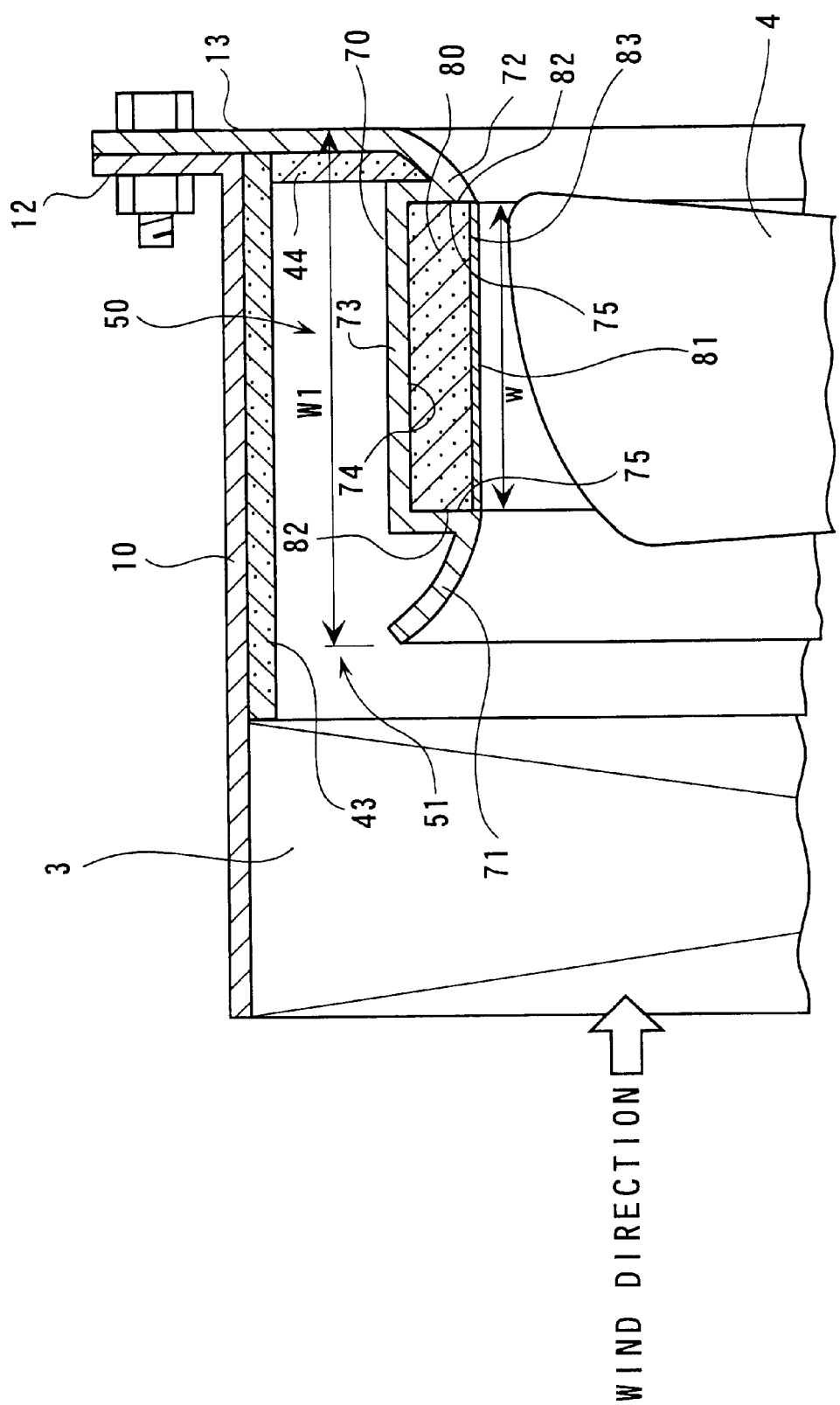
FIG. 11 is an enlarged cross section showing a primary portion of tenth embodiment according to the present invention.

In the present embodiment, upstream and downstream openings 76 and 77 of the fan shroud 70 are smaller than the openings 71 and 72 of the tenth embodiment (see FIG. 11).

The surface of the damping material 80 opposing the end of the fan 4 is composed of flat portion 81 and upstream curved portion 84 and downstream curved portion 85 provided on both sides of the flat portion 81, the respective curved portions 84 and 85 being level and consecutive with the surface of the openings 76 and 77.

Combined size of the upstream curved portion 84 and the upstream opening 76 is substantially the same as the upstream opening 71 shown in FIG. 11. Entirety of the curved portion 84 and the opening 76 forms the upstream bell-mouth shape opening of the present invention.

The combined size of the downstream curved portion 85 and the downstream opening 77 is substantially the same as the downstream opening 72 shown in FIG. 11. Entirety of the curved portion 85 and the opening 77 forms the downstream bell-mouth opening of the present invention.

Further, the damping material 80 of the present embodiment has the cover portion 83 to improve weather resistance and durability.

The other arrangement is the same as the tenth embodiment.

According to the present embodiment, following effects can be obtained as well as above effects of 1) to 5), 10), 11) and 15) to 19). 20). In the present embodiment, though the entire size of the bell-mouth portion of the fan shroud 70 is substantially the same as the tenth embodiment, the curved openings 76 and 77 of the fan shroud 70 are smaller and a part of the bell-mouth portion is formed by the curved portions 84 and 85 of the damping material 80, so that width W2 of the fan shroud 70 of the present embodiment can be smaller than the width W1 shown in FIG. 11 with the same width w of the damping material 80 to maintain the damping property, thus reducing the size of the fan shroud 70 and the radiator hood 10.

[Twelfth Embodiment]

Figure 13:
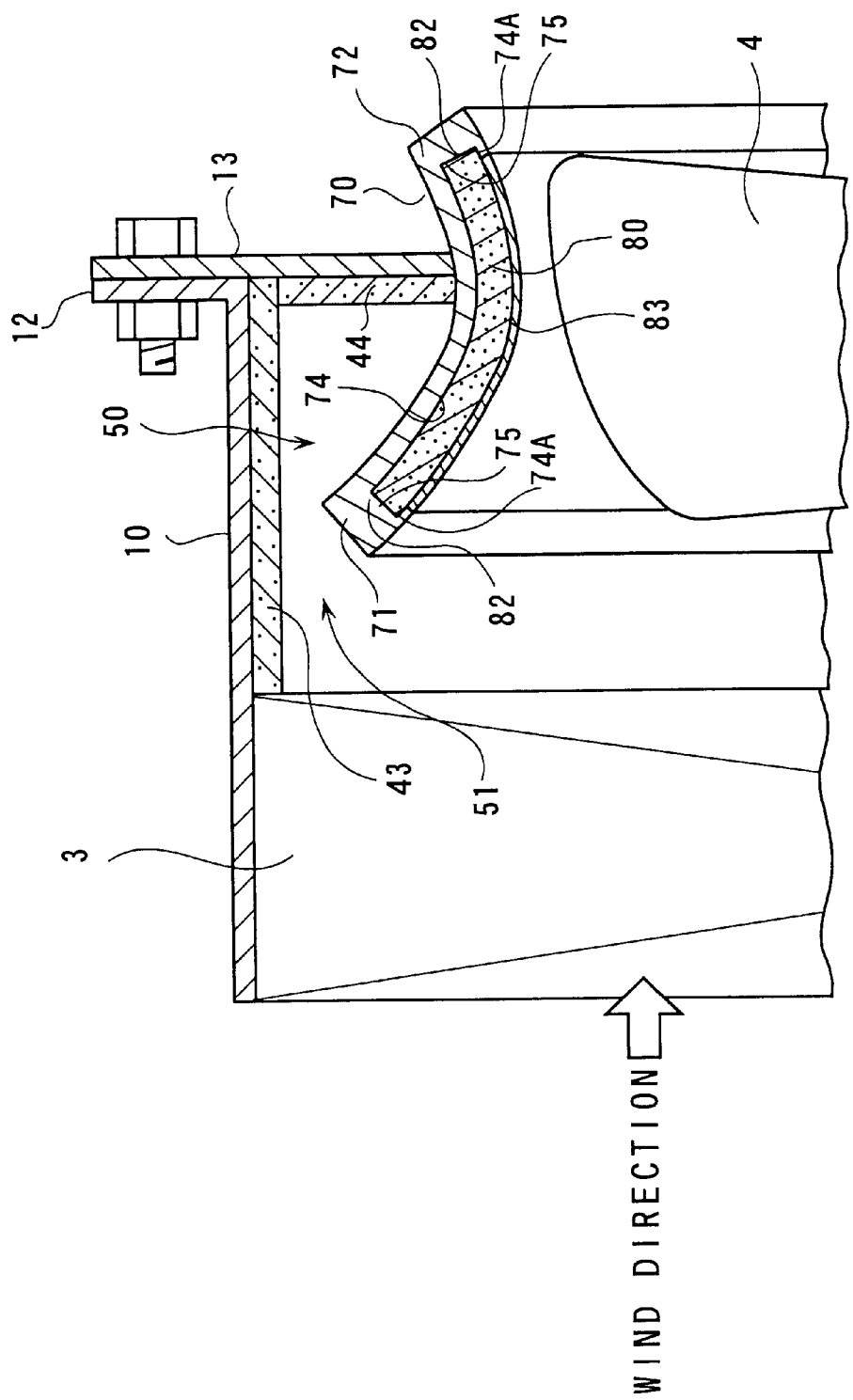
FIG. 13 is an enlarged cross section showing a primary portion of twelfth embodiment according to the present invention.

In the twelfth embodiment shown in FIG. 13, the whole fan shroud 70 has bell-mouth shape and a recessed groove 74 curved along the upstream opening 71 and the downstream opening 72 is provided thereto. The recessed groove 74 is a groove having so-called "lip", which has two projections 74A consecutive along the circumferential direction on the opening side of the recessed groove 74, the projection 74A engaging the damping material 80. In other words, the projections 74A forms the engage member according to the present invention.

Cover portion 83 is formed on a surface of the damping material 80 and the surface is level with the surface of the openings 71 and 72 of the fan shroud 70 including the projections 74A.

Incidentally, though the thickness of the projections 74A and the cover portion 83 is the same in FIG. 13, the thickness may be independently defined and not necessarily the same.

Following effect can be obtained in the present embodiment in addition to the effects 1) to 5), 10), 11), 15), 16) and 18). 21) Since the projections 74A for engaging the damping material 80 is provided to the fan shroud 70, the damping material 80 is not likely to be peeled off from the recessed groove 74, thus maintaining good attachment of the damping material 80 to improve reliability.

[Modifications]

Incidentally, the noise reduction mechanism of fan device according to the present invention is not restricted to the above-described embodiment but includes other arrangements as long as an object of the present invention can be achieved, and following modifications are also included in the scope of the present invention.

Figure 14:
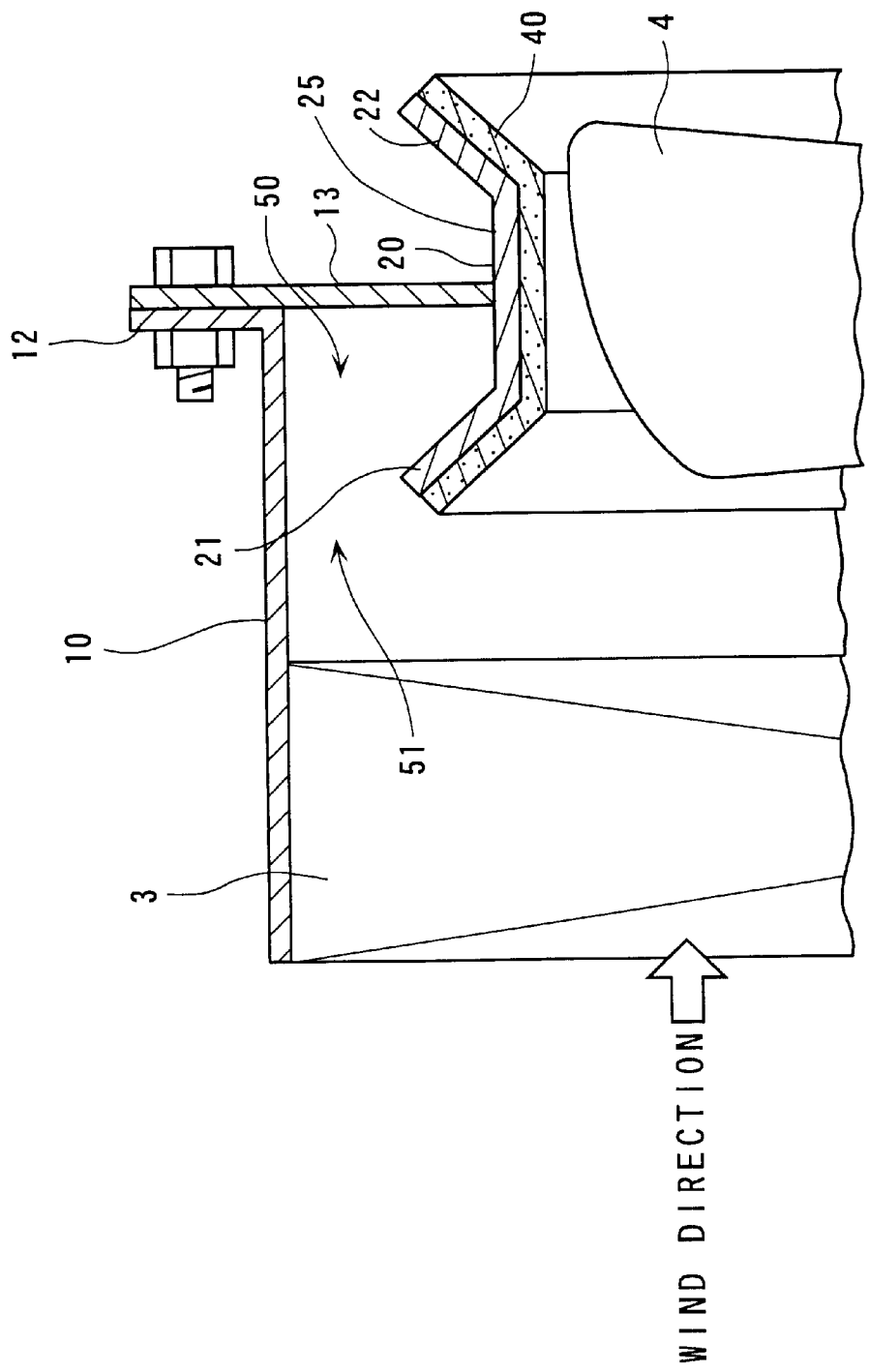
FIG. 14 is a cross section showing first modification of the present invention.

For instance, though the fan shrouds 20 and 70 of first to eighth and tenth to twelfth embodiments are configured in bell-mouth shape by the curved openings 21, 22, 71 and 72, the fan shroud according to the present invention may have linearly widened upstream and downstream openings 21 and 22 as shown in FIG. 14 (the first modification), and parallel portion 25 may be provided between the openings. In this case, though the effect 5) described in the first embodiment may not be sufficiently performed, the other effects 1) to 4) and 6) to 8) can be also attained.

Figure 15:
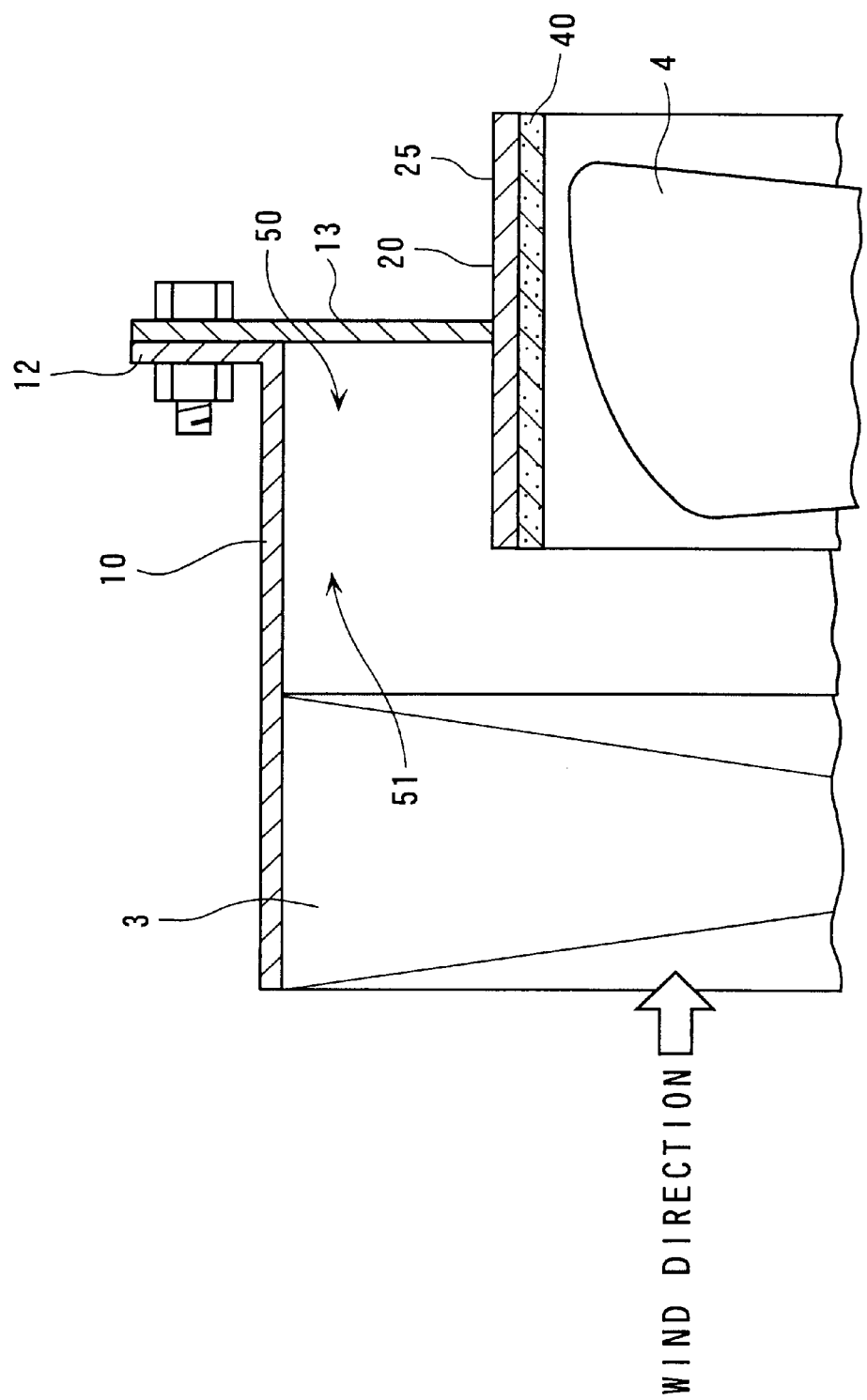
FIG. 15 is a cross section showing second modification of the present invention.
Figure 16:
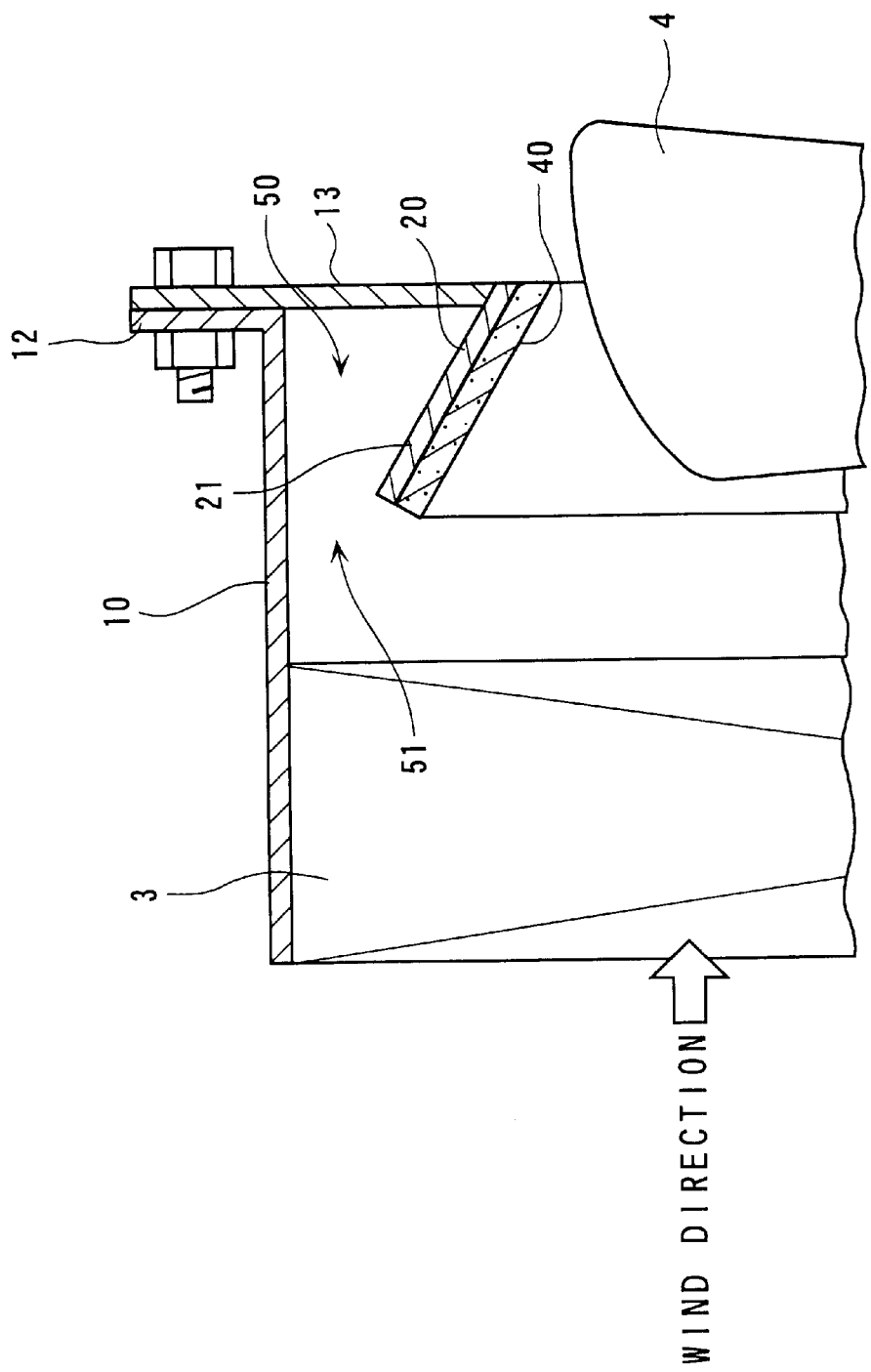
FIG. 16 is a cross section showing third modification of the present invention.
Figure 17:
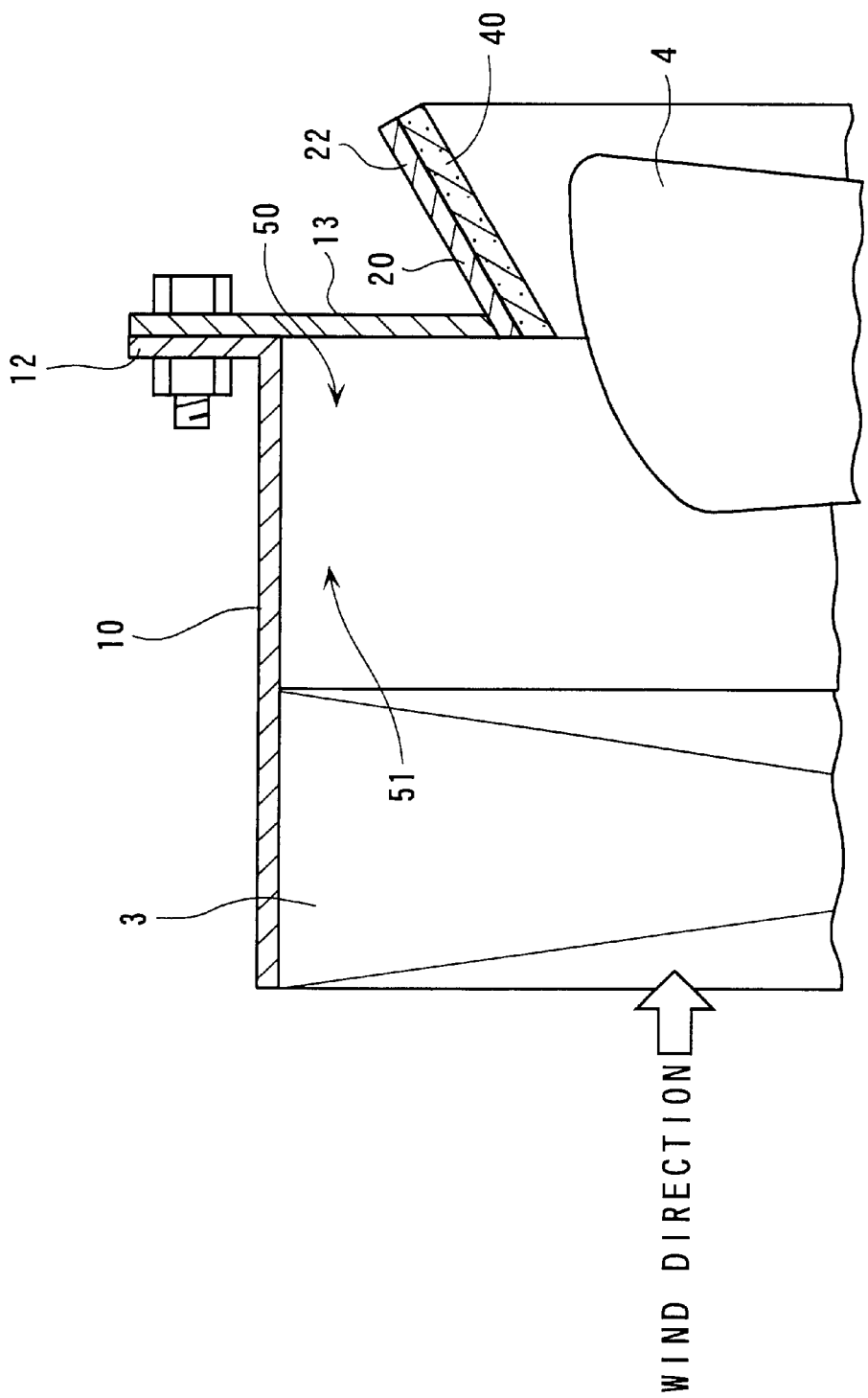
FIG. 17 is a cross section showing fourth modification of the present invention.

The fan shroud may be configured to have the same size in the upstream opening and the downstream opening or may be cylindrical composed only of the parallel portion 25 as shown in FIG. 15 (second modification). Further alternatively, the fan shroud may be composed only of linear opening 21 extending into the upstream radiator hood 10 as shown in FIG. 16 (third modification) or may be composed only of linear opening 22 extending toward downstream as shown in FIG. 17 (fourth modification). In this case, the damping chamber 50 or the space 52 can be formed by the space surrounded by the radiator hood 10, the end plate 13 and the fan shroud 20.

Further, the fan shroud may have a configuration shown in double-dotted line in FIG. 8. The above arrangement is also included in the present invention by attaching the damping material to the fan shroud.

The configuration of the radiator hood is also defined in any manner, and the radiator hood may be formed in bell-mouth shape consecutive with the fan shroud shown in single-dotted line in FIG. 8.

Figure 18:
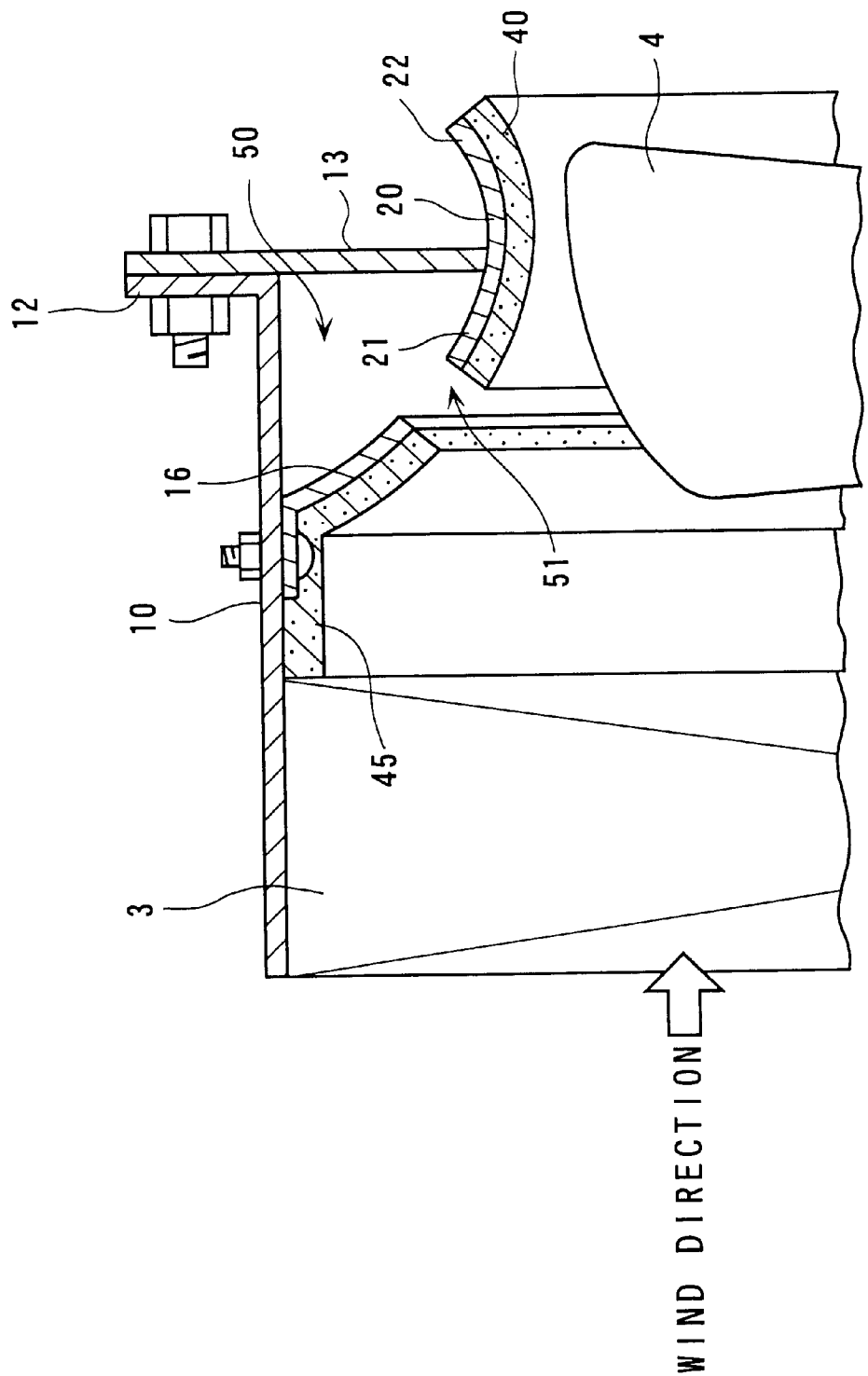
FIG. 18 is a cross section showing fifth modification of the present invention.
Figure 19:
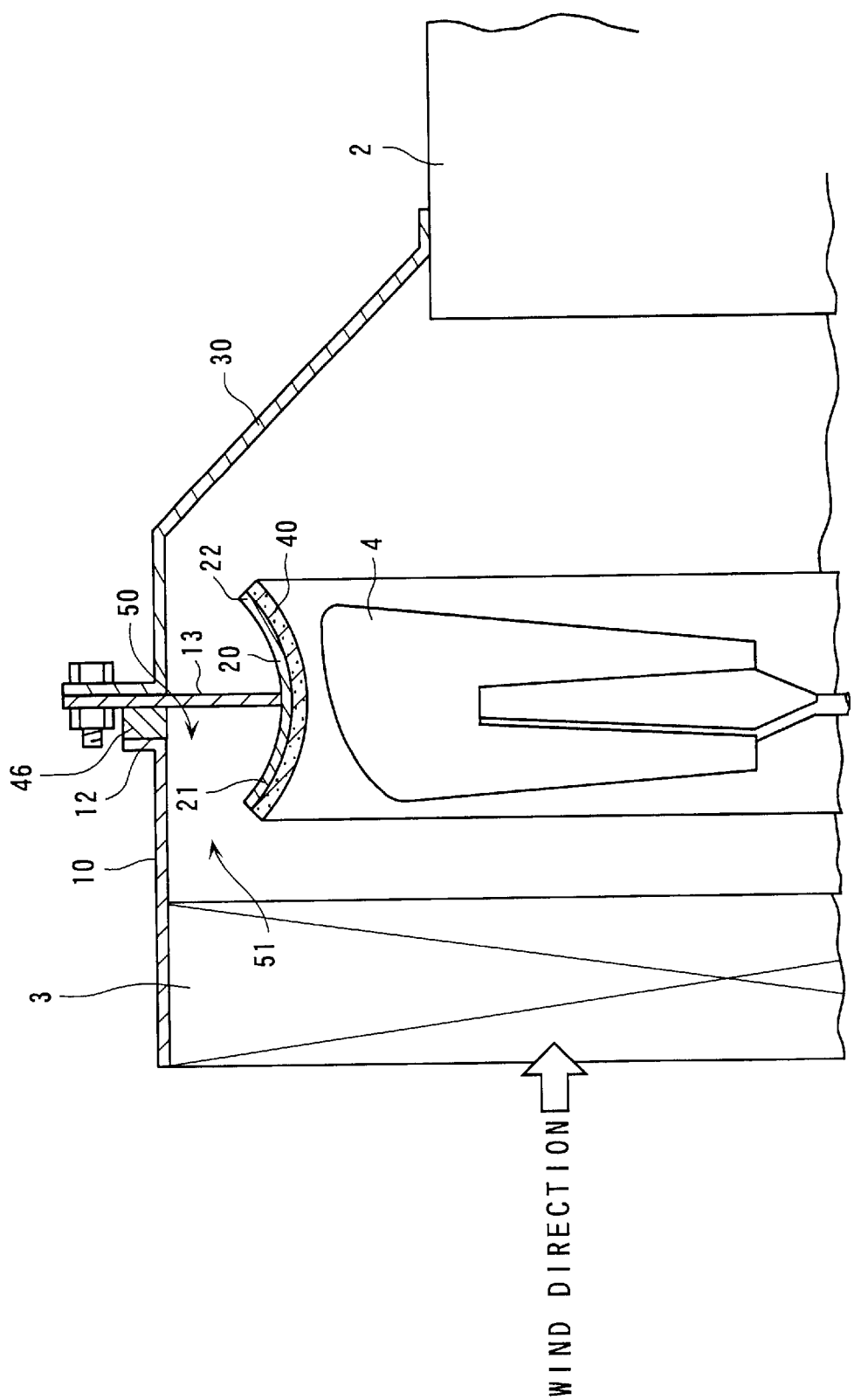
FIG. 19 is a cross section showing sixth modification of the present invention.

Though the upstream opening 21 of the fan shroud 20 extends farther toward the upstream side to increase degree of enclosure of the damping chamber, the size of the upstream opening 21 may be arranged to be substantially the same as or smaller than the downstream opening 22 and a separate adjusting member 16 may be provided to inner circumference of the radiator hood 10 to enhance degree of enclosure of the damping chamber 50, as shown in FIG. 18 (fifth modification). At this time, the damping material 45 may preferably be attached to the adjusting member 16.

Though the end plate 13 directly fixed to the radiator hood 10 side is used in the above-described respective embodiments, the end plate 13 may be fixed to the upstream side of the cover hood 30 supported at the engine 2 side and the end plate 13 may be abutted to the radiator hood 10 through the damping material 46 etc. working also as a sealing member. In other words, the end plate of the present invention is only required to be provided to fan side of the radiator hood and may be fixed to any member.

When the end plate 13 and the fan shrouds 20 and 70 are formed as independent body, these components may be connected by bolts and nuts as well as integrating by welding etc.

Further, the fan shroud may be supported by the end plate or other support member independent from the end plate. However, the end plate preferably works also as the support member in economical viewpoint, since the support member is not necessary to be provided as an independent component.

Figure 20:
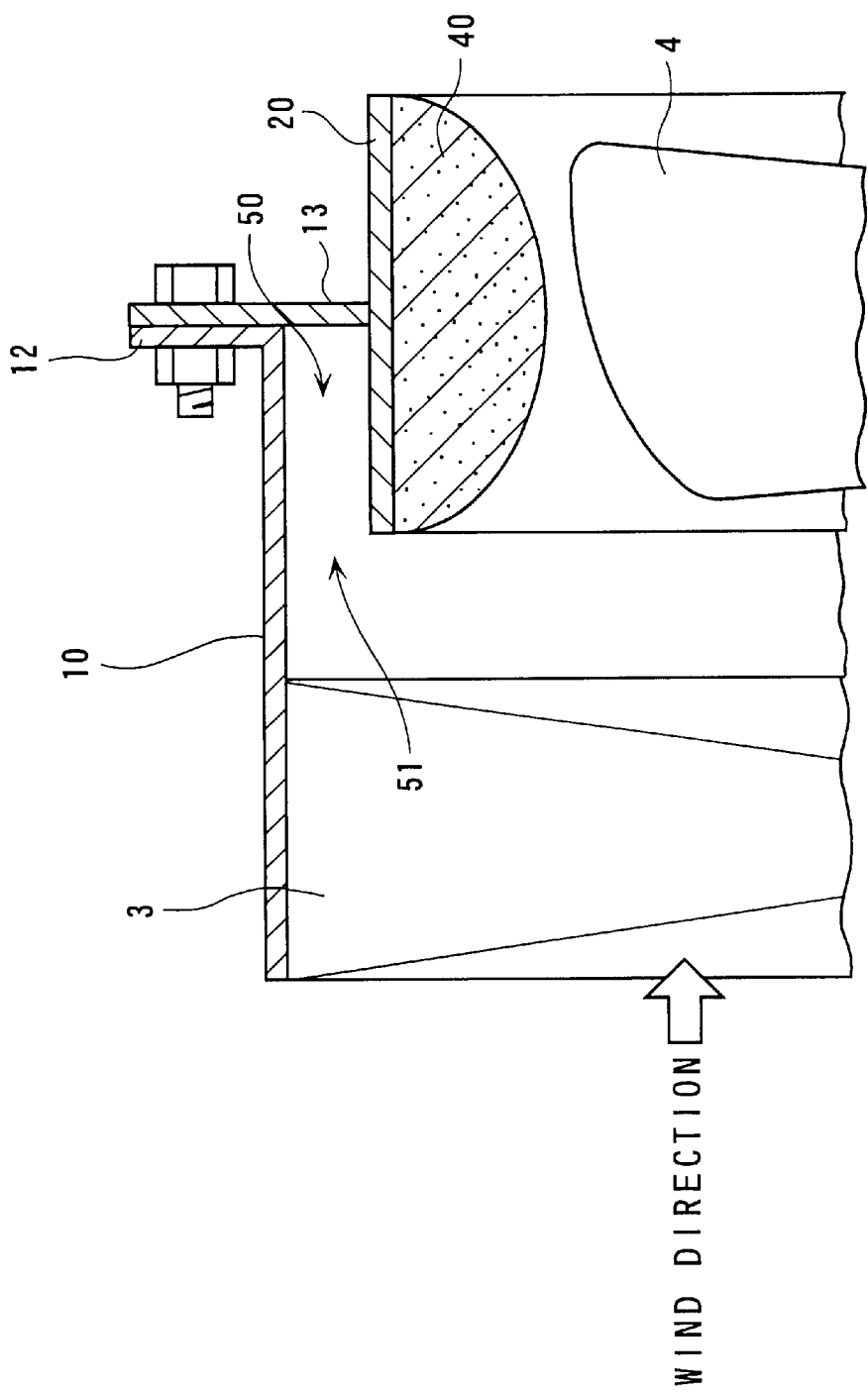
FIG. 20 is a cross section showing seventh modification of the present invention.

The fan shroud 20 and damping material 40 shown in FIG. 20 (seventh embodiment) is included in the scope of the present invention. In other words, the fan shroud 20 is a cylinder having the same inner diameter on the whole and is not formed in bell-mouth shape, the inner shape of the damping material 40 itself is bell-mouth shape.

The material of the radiator hood, the fan shroud, the end plate is not restricted to metal but may be resin.

The porous damping material is not restricted to foamed urethane resin and PET (polyethylene terephtalate) but any porous material having damping property can be used. Such damping material is, for instance, porous PTFE (polytetrafluoroethylene), foamed FEP (fluorinated ethylene propylene) having superior weather resistance and heat resistance as well as damping property. However, foamed urethane resin is more preferable in view of inexpensiveness and good damping property.

Further, the damping material is not restricted to single-layered material but may have a plurality of layer. In this arrangement, the damping material proximal to the exposed surface preferably has smaller hole diameter for further efficiently reducing the noise. Incidentally, such layer is for improving the damping effect, which is different from the cover portion described in the tenth embodiment etc.

In the arrangement of the first embodiment, the combination of holes 14, 15 and 23 and attachment of the damping material 43 and 44 to either one of the radiator hood 10 and the end plate 13 can be decided in any manner, which is not restricted to combinations shown in the second to seventh embodiments. For instance, though not shown, the damping material may be attached only to the end plate and not to the radiator hood. Alternatively, the damping material may be attached to both of the radiator hood and the end plate and the hole may be drilled only to the end plate. Incidentally, the portion onto which the hole is drilled is preferably covered with the damping material on flow channel side of the cooling water in order to prevent the impulsive sound.

The cover portion for improving weather resistance and durability may be formed on the damping material 40 of first to eighth embodiments and first to seventh modifications, and the damping materials 41 to 46 shown in respective figures may have the cover portion.

Further, the end portion of the damping material 40 to 46 may be protected by the protector as necessary, and may be prevented from falling off from the radiator hood 10, the fan shroud 20 and the cover hood 30 using the engage member.

Figure 21:
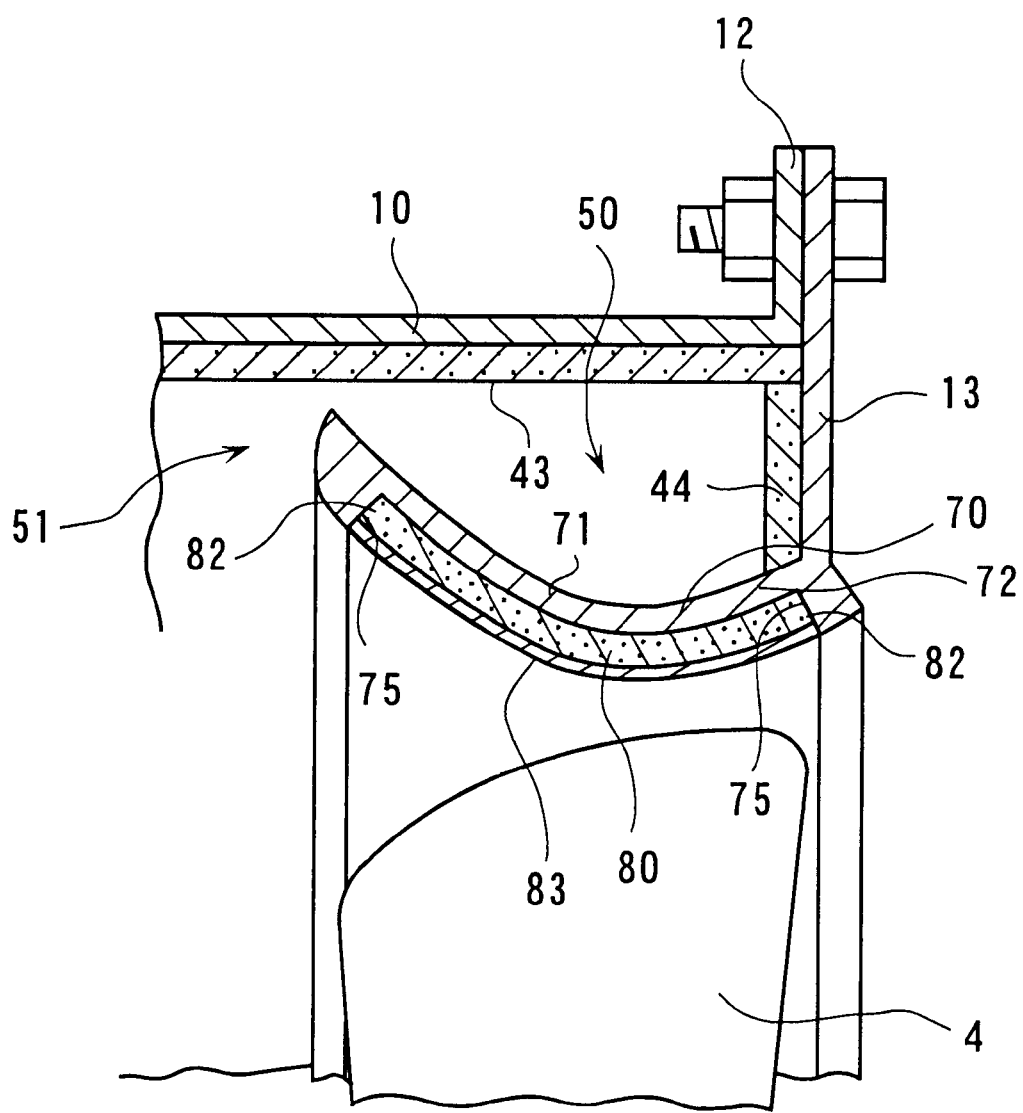
FIG. 21 is a cross section showing eighth modification of the present invention.

FIG. 21 shows an example where the bell-mouth shape of the fan shroud 70 extends along the thickness portion on upstream end. According to the arrangement, the cooling air on the upstream can be more smoothly sucked in, thus reducing further noise and improving cooling efficiency. Incidentally, the bell-mouth portion may extend over the downstream thickness portion, so that the cooling air can be smoothly flowed out on the downstream side.

The protector according to the present invention is not restricted to the elevational portion 75 of the recessed groove 74 described in the tenth to twelfth embodiments.

For instance, the end portion of the damping material may be protected by a circular member fixed along the peripheral direction of the fan shroud. Specific shape of the protector may be defined in any manner for implementation.

Figure 22:
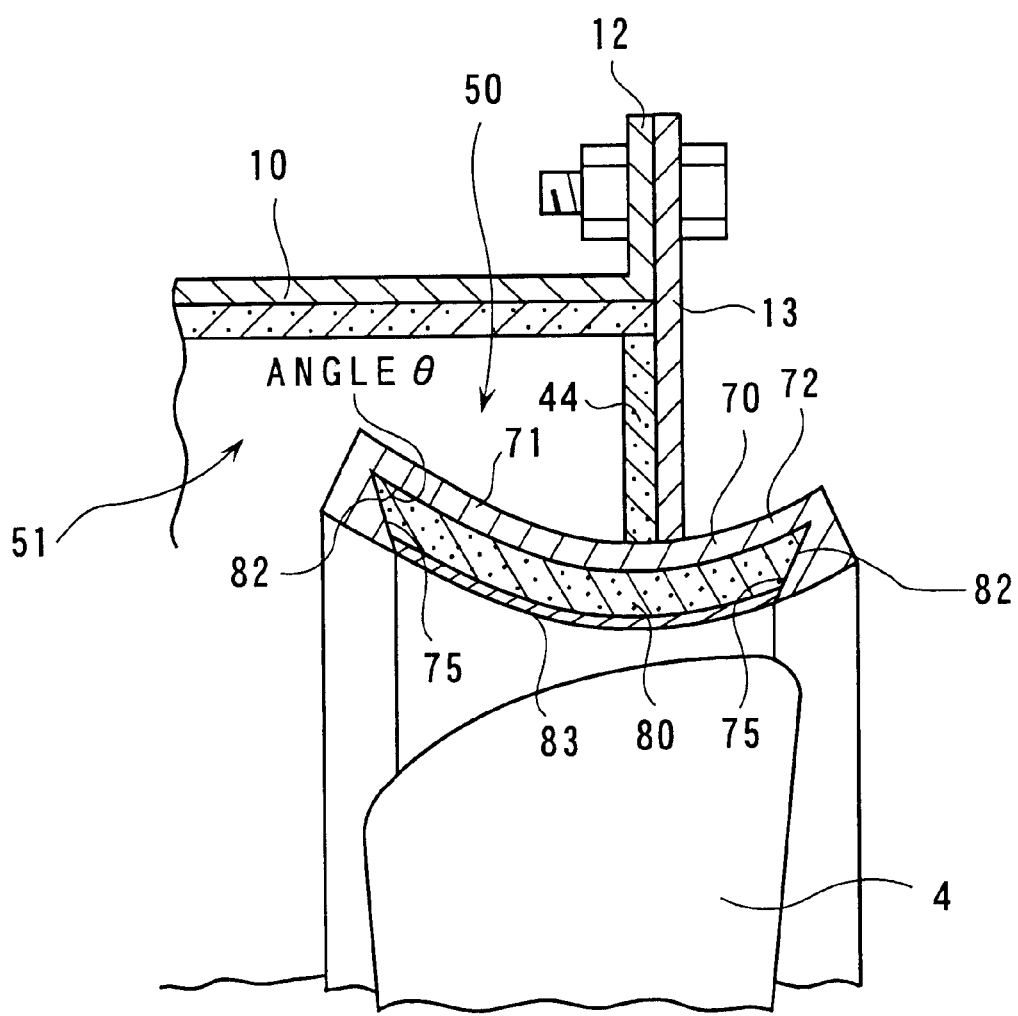
FIG. 22 is a cross section showing ninth modification of the present invention.
Figure 23:
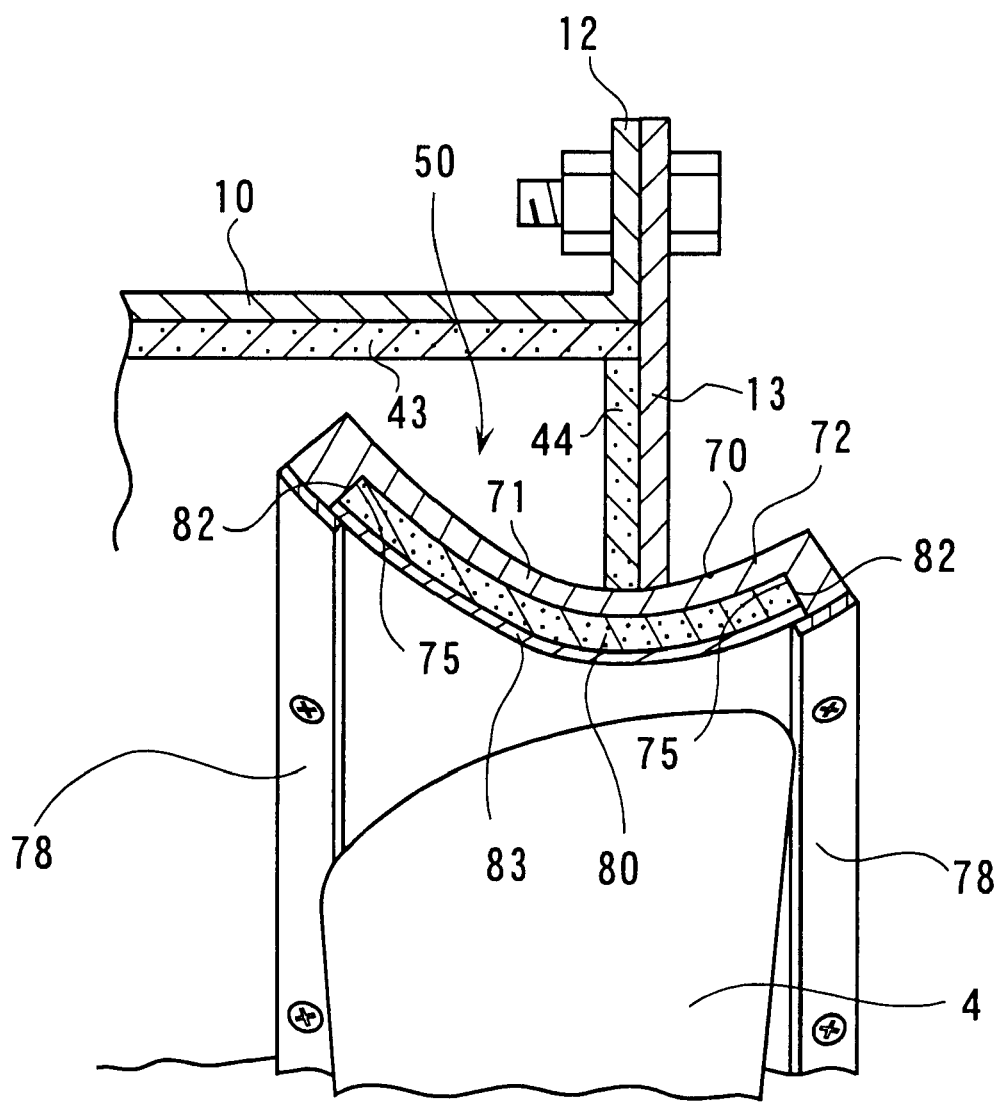
FIG. 23 is a cross section showing tenth modification of the present invention.
Figure 24:
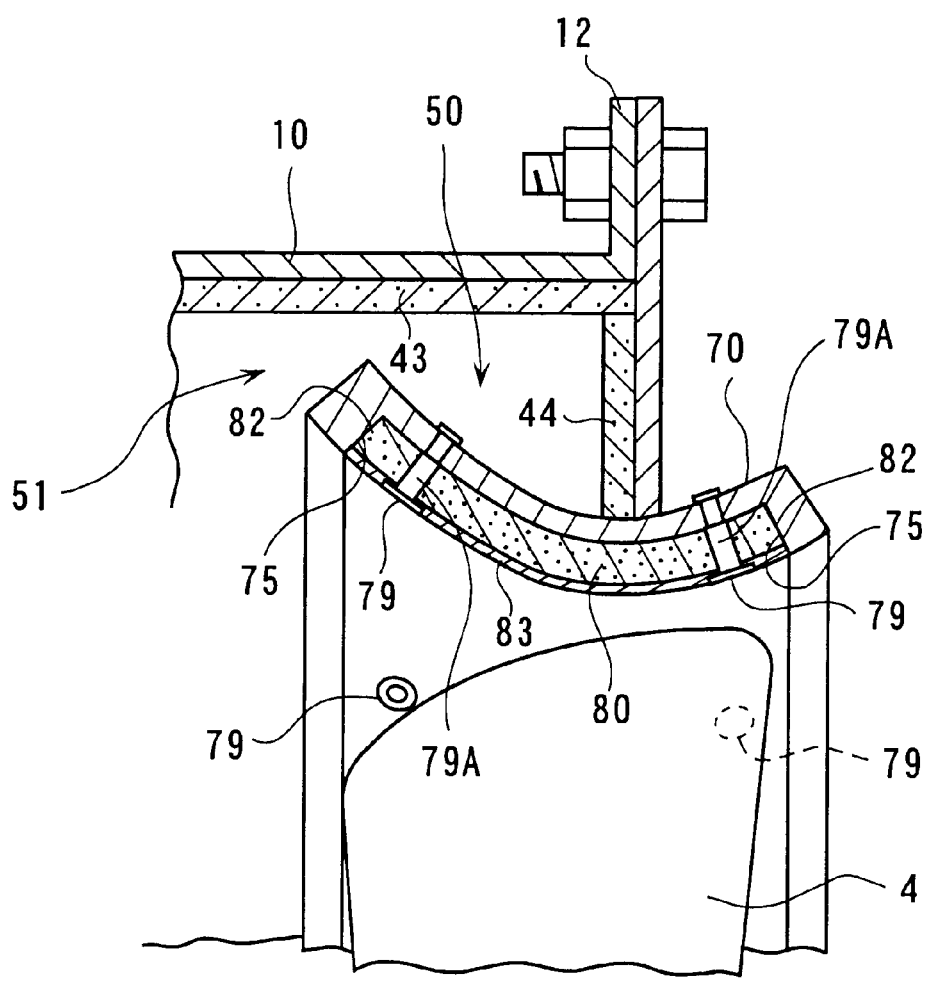
FIG. 24 is a cross section showing eleventh modification of the present invention.

FIGS. 22 to 24 show modifications of engage member according to the present invention.

In FIG. 22, the recessed groove 74 is a dovetail groove, which is open to be narrowed toward the fan 4. In the recessed groove 74, the slanting elevational portion 75 as the protector works also as the engage member and the damping material 80 does not come off from the fan shroud 70 being engaged with the elevational portion 75. Angle θ of the elevational portion 75 is not restricted as long as the damping material 80 does not come off, which is preferably 10 to 30 degrees.

FIG. 23 shows an independent annular member 78 as the engage member fixed to ends of the upstream and downstream side by vis etc. and the damping material 80 is engaged by a portion projecting toward the recessed groove 74 of the annular member 78.

FIG. 24 shows an example where rivet 79 made of synthetic resin is used as the engage member. The rivet 79 pierces the cylindrical member 79A for securing thickness of elastic damping material 80.

Incidentally, any configuration can be used for the engage member, which is not restricted to the above. For instance, a plurality of circumferential portions of the damping material 80 may be engaged using a piece-shaped bracket. Further, when the damping material is not contained in the recessed groove 74, the damping material may be engaged using a proper annular member, bracket, rivet and the like.

Figure 25:
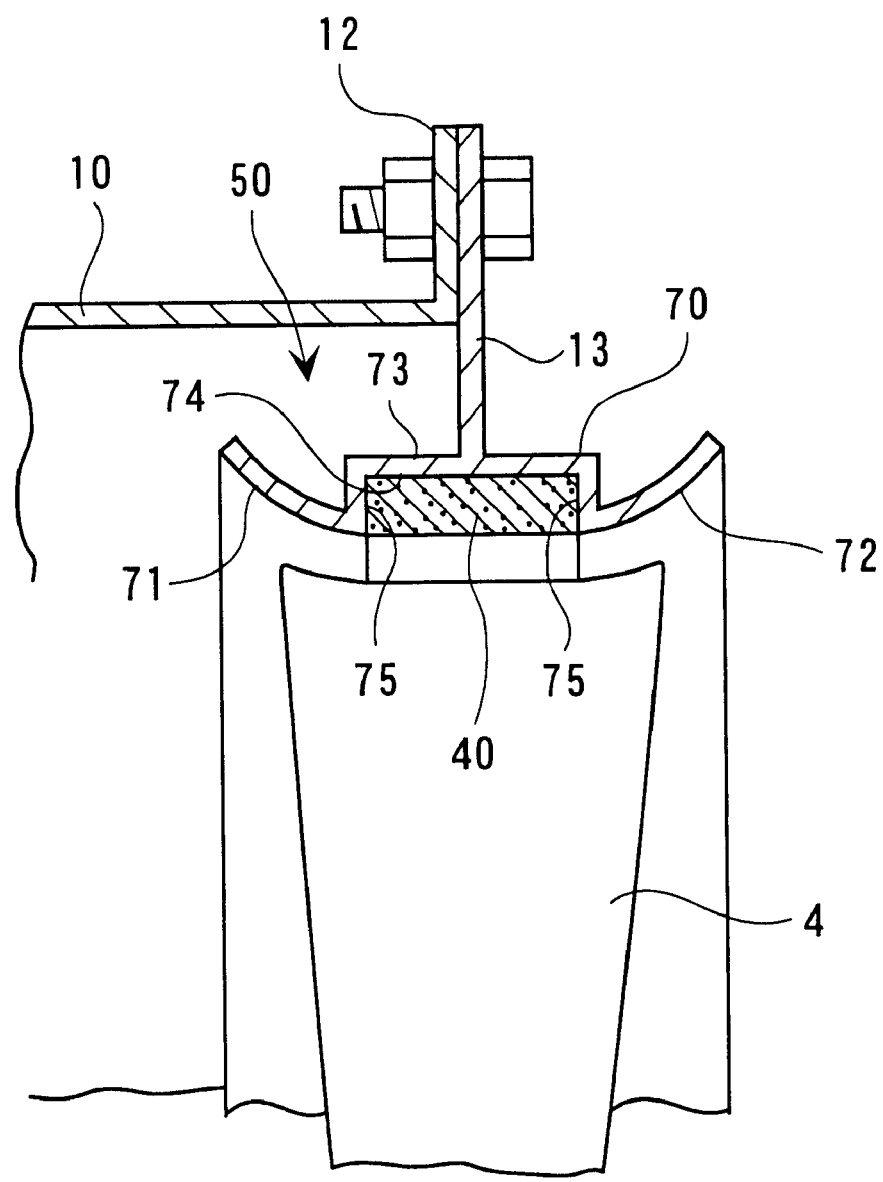
FIG. 25 is a cross section showing twelfth modification of the present invention.

Further, the end configuration of the fan according to the present invention is not restricted to the specific configuration described in the above embodiments and the modifications, but may be configured as shown in FIG. 25.

The end of the fan 4 shown in FIG. 25 is curved to be recessed in the middle along the shape of the fan shroud 70, so that the gap between the end of the fan 4 and the fan shroud 70 (including the porous damping material 40) becomes constant. Such arrangement is also included in the present invention in that the damping material 40 is attached to the fan shroud 70 and noise reduction is possible.

Further, since the cooling air flows smoothly from the upstream to the downstream along the end configuration of the fan 4, the flow rate can be increased while reducing the noise.

[Thirteenth Embodiment]

Figure 26:
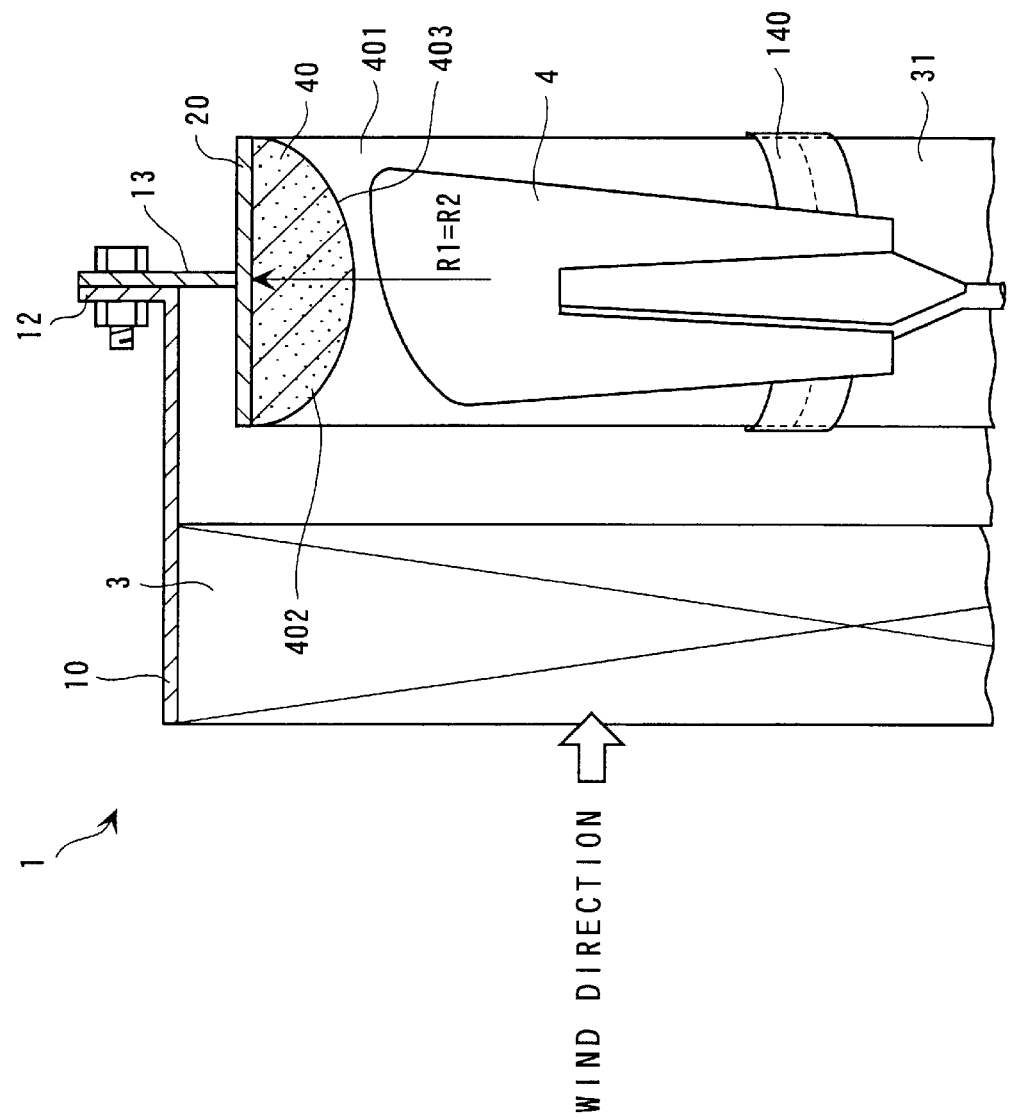
FIG. 26 is an enlarged cross section showing a primary portion of a noise reduction mechanism of a fan device according to thirteenth embodiment of the present invention.

FIG. 26 shows a primary portion of an application of the noise reduction mechanism of a fan device according to the present invention to an engine cooling system 1 of construction equipment such as an excavator.

Basic arrangement of the engine cooling system 1 is the same as the above-described first embodiment (see FIG. 1), and detailed explanation of the components mentioned therein (the engine 2, the radiator 3, the fan 4, the outer fringe 12, the end plate or the support 13 of the shroud, the fan shroud 20 and the porous damping material 40) are omitted.

The fan shroud 20 has a simple arrangement where ends of a metal band is connected by welding etc. to be a cylinder, which is spaced apart by a predetermined gap from the rotation locus of the end of the fan 4. A, for instance, resin-made porous damping material 30 is exposed on substantially entire inner circumference of the fan shroud 20, thus reducing jet noise and impulsive sound generated between the end of the fan 4 and the fan shroud 20.

Figure 27:
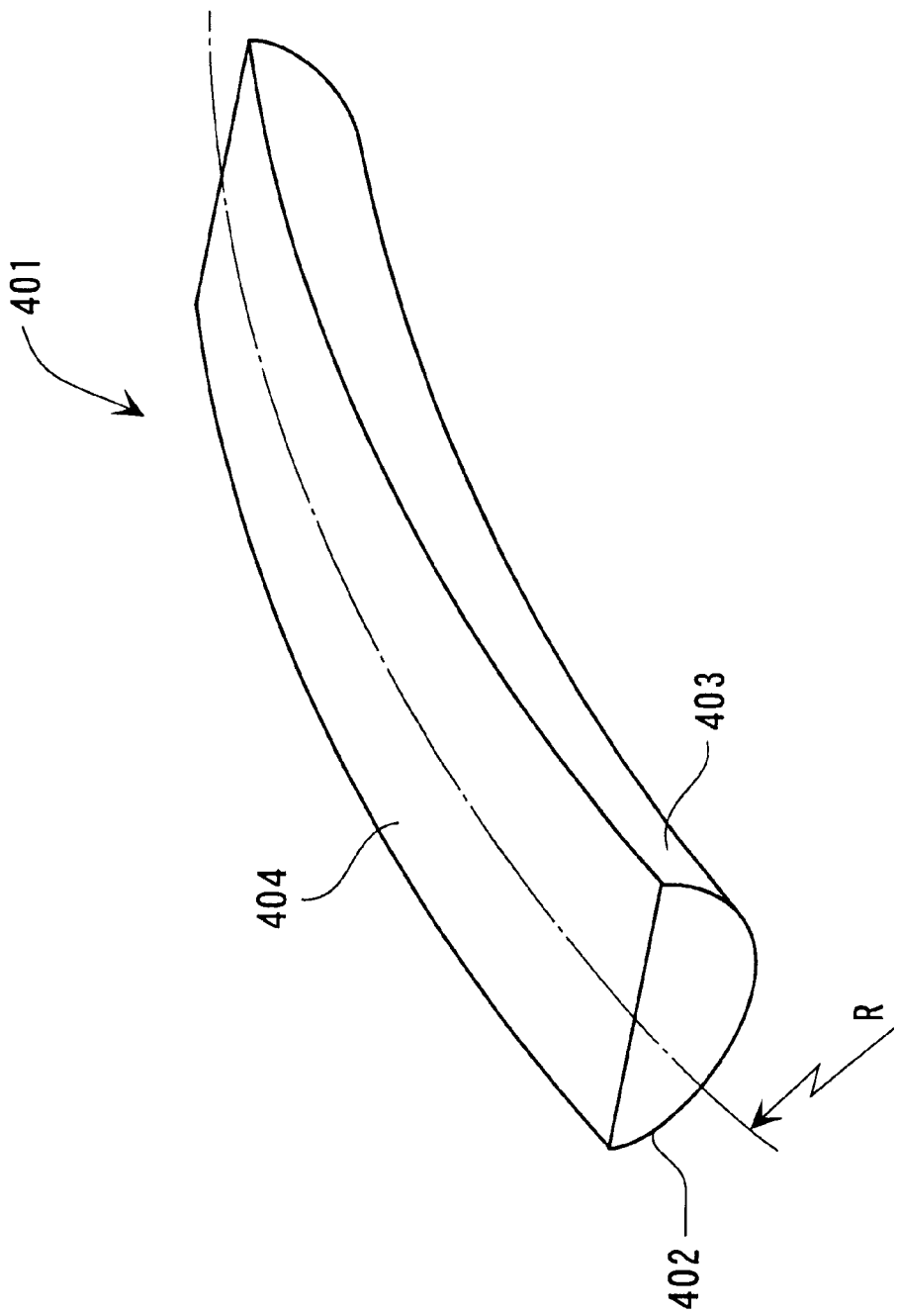
FIG. 27 is an entire perspective of a component of the thirteenth embodiment.

The porous damping material 40 is composed of a plurality of (four or six, in the present embodiment) porous members 401 adhered along the circumference of the fan shroud 20. The porous members 401 has a semi-oval cross section with an upstream opening 402 opening toward upstream in a bell-mouth fashion and a downstream opening 403 opening toward downstream side in a bell-mouth fashion extending approximately from the support member 13, which is curved as shown in FIG. 27. At this time, the radius R1 of an attachment surface 404 of the porous member 401 is equal to the inner diameter R2 (FIG. 26) of the inner circumference (attached surface) of the fan shroud 20. Further, the respective openings 402 and 403 of the porous member 401 are formed in the bell-mouth shape, thus smoothly flowing the cooling air between the end of the fan 4 and the fan shroud 20. As described below, the porous member 401 is a die-molding product molded using a die.

Figure 28:
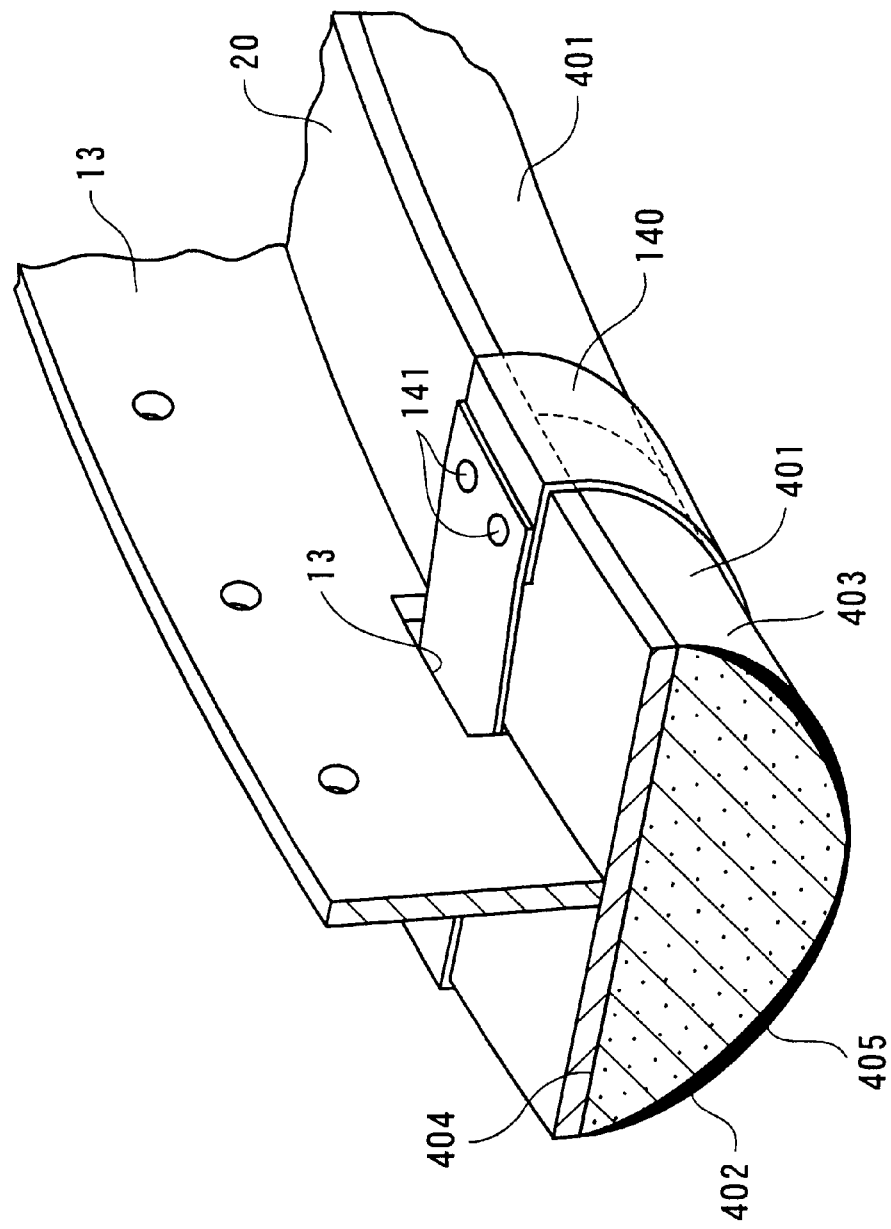
FIG. 28 is a further enlarged perspective of the primary portion of the thirteenth embodiment.

The respective porous members 401 are disposed so that both ends in the longitudinal direction confront with each other, the confronting portions being hidden by the belt 140 shown in FIGS. 26 and 28. A belt 140 is a dropout prevention member according to the present invention, which passes through an insert hole 13 of the support 13 to be wound around the confronting portion of the porous member 401 and the fan shroud 20. The end of the belt 140 is mutually connected by an appropriate joint 141. Accordingly, the porous member 401 does not easily come off even when the porous member 401 is peeled, thus avoiding problem of contacting the fan 4. Though the material of the belt 140 is not limited, the same material as the fan shroud 20 such as metal and resin may preferably be used.

Further, as shown enlarged in FIG. 28, a rigid protection layer 405 with the foam being collapsed is formed on the surface of the porous member 401. The protection layer 405 is thin at an approximately center relative to the flow direction of the cooling air (wind direction), which becomes initially thick and gradually becomes thin toward both ends. In other words, the foam is well formed at the position adjacent to the surface thereof because the protection layer 405 at the center relatively close to the end locus of the fan 4, thus not impairing damping properties of the porous damping material 40.

Next, a molding method of the porous member 401 constituting the porous damping material 40 will be described below with reference to FIG. 29(A) to FIG. 29(C).

Figure 29A:
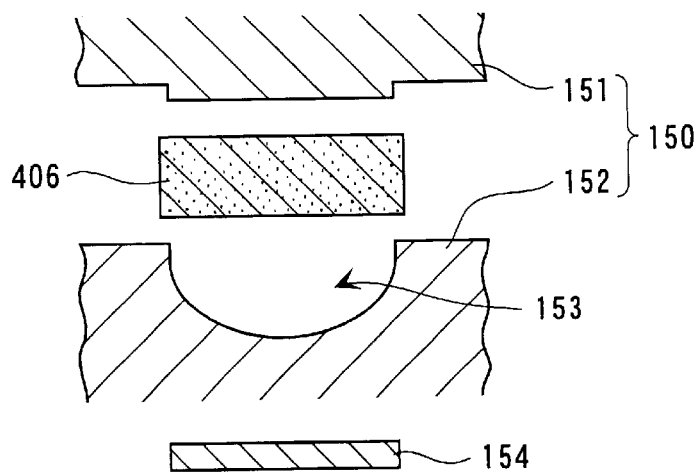
FIG. 29(A), FIG. 29(B) and FIG. 29(C) are cross sections for illustrating a molding method of the thirteenth embodiment.

In FIG. 29(A), a cavity 153 having an approximately semi-oval cross section corresponding to final configuration of the porous member 401 can be formed by engaging an upper die 151 and a lower die 152. A foam material 406 having larger volume than the volume of the cavity 153 and having a square cross section is prepared and is packed in the cavity 153. The foam material 406 may preferably be a synthetic resin such as a foamed urethane resin and polyethylene terephthalate (PET).

Figure 29B:
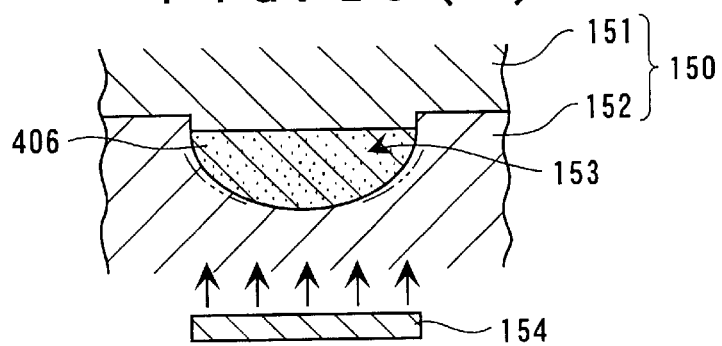

In FIG. 29(B), the foam material 406 is filled in the cavity 153 by engaging the respective dies 51 and 52. At this time, since the volume of the foam material 406 is larger than the volume of the cavity 153, the foam is collapsed on the surface of the foam material 406 and contact area against the cavity 153 is enlarged with the dense foam. Especially, since the original configuration of the foam material 406 has square cross section, the position of the curve of the cavity 153 provided to the lower die 152 shown in double-dotted line in the figure is greatly collapsed.

Subsequently, the curve of the cavity 153 of the lower die 152 is heated by a heater 154 installed in the lower die 152.

Figure 29C:
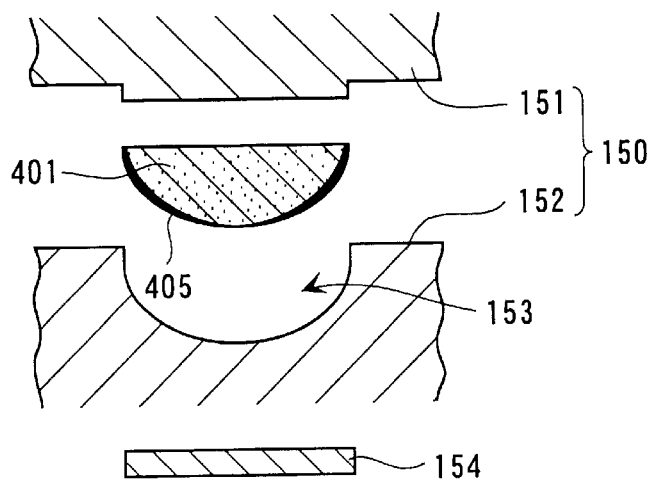

Then, as shown in FIG. 29(C), the surface of the foam material 406 in contact with the curve of the cavity 153 is melted and solidified to form the protection layer 405. The protection layer 405 is thick at the above-described double-dotted line portion having large contact area against the cavity 153 and the foam thereon is greatly collapsed. It is speculated that this is because the heat during the heating process is well transmitted on account of the large contact area, so that the foam material is comparatively well melted.

The porous member 401 is molded as described above.

According to the present embodiment, following effects can be obtained.

(A1) Since the porous member 401 constituting the porous damping material 40 is a die-molding product made using the die 150 having the cavity 153, the porous member 401 having an approximately semi-oval cross section with bell-mouth configuration and curved in the longitudinal direction can be easily obtained.

(A2) Since the bell-mouth configuration is arranged on the porous member 401, the bell-mouth configuration is not necessary to be arranged on the fan shroud 20 and the fan shroud 20 can be formed in a simple cylindrical shape. Accordingly, the fan shroud 20 can be manufactured without using a large press die etc., thus greatly reducing the cost for the die and the components.

(A3) Since the porous member 401 is formed in a curved shape and has the same diameter R1 as the inner diameter R2 of the fan shroud 20, the porous member 401 can be directly attached to the inner circumference of the fan shroud 20, thus facilitating attachment process.

Further, since the wrinkle is not generated in attaching the porous member 401, the surface condition can be kept well, thus preventing excessive jet noise against the end of the fan 4.

(A4) Since the porous damping material 40 is composed of the plurality of the porous member 401, the size of the die 150 can be reduced, thus further reducing die cost.

Further, since the porous member 401 can be formed in short length, the porous member 401 can be easily handled and the storing space can be reduced, thus facilitating transportation thereof and reducing management cost.

(A5) Since the porous member 401 has the bell-mouth configuration, the wind flow of the cooling air required for heat exchange at the radiator 3 can be sufficiently secured even when the frequency of the fan 4 is lowered, thus further reducing the noise.

(A6) Since the porous member 401 is not only adhered to the fan shroud 20 but attached to the fan shroud by the belt 140, the dropout of the porous member 401 can be prevented even when the adhesion of the porous member 401 is deteriorated, thus preventing problem of contact of the porous member 401 against the fan 4 in advance.

Since it is only required for the belt 140 to be wound around the porous member 401 and the fan shroud 20 by being inserted to the insert hole 13 of the support 13, the belt 140 can be easily attached.

Further, since the belt 140 is would around to cover the confronting portion of the adjacent porous members 401, the boundary portion between the porous members 401 easily peeled off by collision of sand dust etc. can be effectively protected by the belt 140, thus improving durability thereof.

(A7) Since the rigid protection layer 405 is formed on the surface of the porous member 401, the porous member 401 can be effectively protected from dust and rain, thus improving weather resistance and durability of the porous member 401 and, in consequence, the entire porous damping material 40.

Further, the protection layer 405 can be easily formed by using the foam material 406 having larger volume than the volume of the cavity 153 and heating the surface of the foam material 406 to melt and solidify.

(A8) Since the foam material with square cross section is packed in the cavity 153 having semi-oval cross section, the protection layer 405 is thin at the center relative to the flow direction of the cooling air and is thick toward both ends. Accordingly, the foam is sufficiently retained at the central portion relatively close to the end locus of the fan 4 even at the position adjacent to the surface of the porous member 401, thus securely reducing the jet noise. On the other hand, the dust and rain can be securely prevented by the thick protection layer 405 on both end sides, i.e. the air inlet side on the upstream and the air outlet side on the downstream.

[Thirteenth to Twentieth Modifications]

Incidentally, the scope of the present invention related to molding method is not limited to the above-described thirteenth embodiment but includes modifications described below.

For instance, though the fan shroud 20 of the thirteenth embodiment is cylindrical, a frustum fan shroud 61 enlarging toward downstream side or a fan shroud 62 with V-shaped cross section having enlarging circumference toward both upstream side and downstream side can be preferably used as shown in FIGS. 30 and 31 (the thirteenth and fourteenth modifications). In other words, the configuration of the fan shroud may be designed in any shape considering convenience in manufacture and attachment process of the porous damping material.

Further, as shown in a fan 63 illustrated in FIG. 30, the end shape of the fan may also be designed at will. The end of the fan 63 has a center-dented shape so that the gap against the porous damping material 40 can be constant. According to the present arrangement, since the cooling air can flow smoothly from the upstream side toward the downstream side along the end configuration of the fan 63, the flow rate can be increased while reducing noise.

The porous member of the present invention may be designed in any cross section considering convenience in manufacture and attachment process, which may, for instance, be disposed in plural not only along circumference of the fan shroud 62 but also in flow direction of the cooling air as shown in the porous member 64 attached to the fan shroud 62 having V-shaped cross section illustrated in FIG. 31. Especially, since the porous member 64 uses the identical porous member 64 on the upstream side and the downstream side that is attached in different directions, only one type of molding die is necessary.

Figure 32:
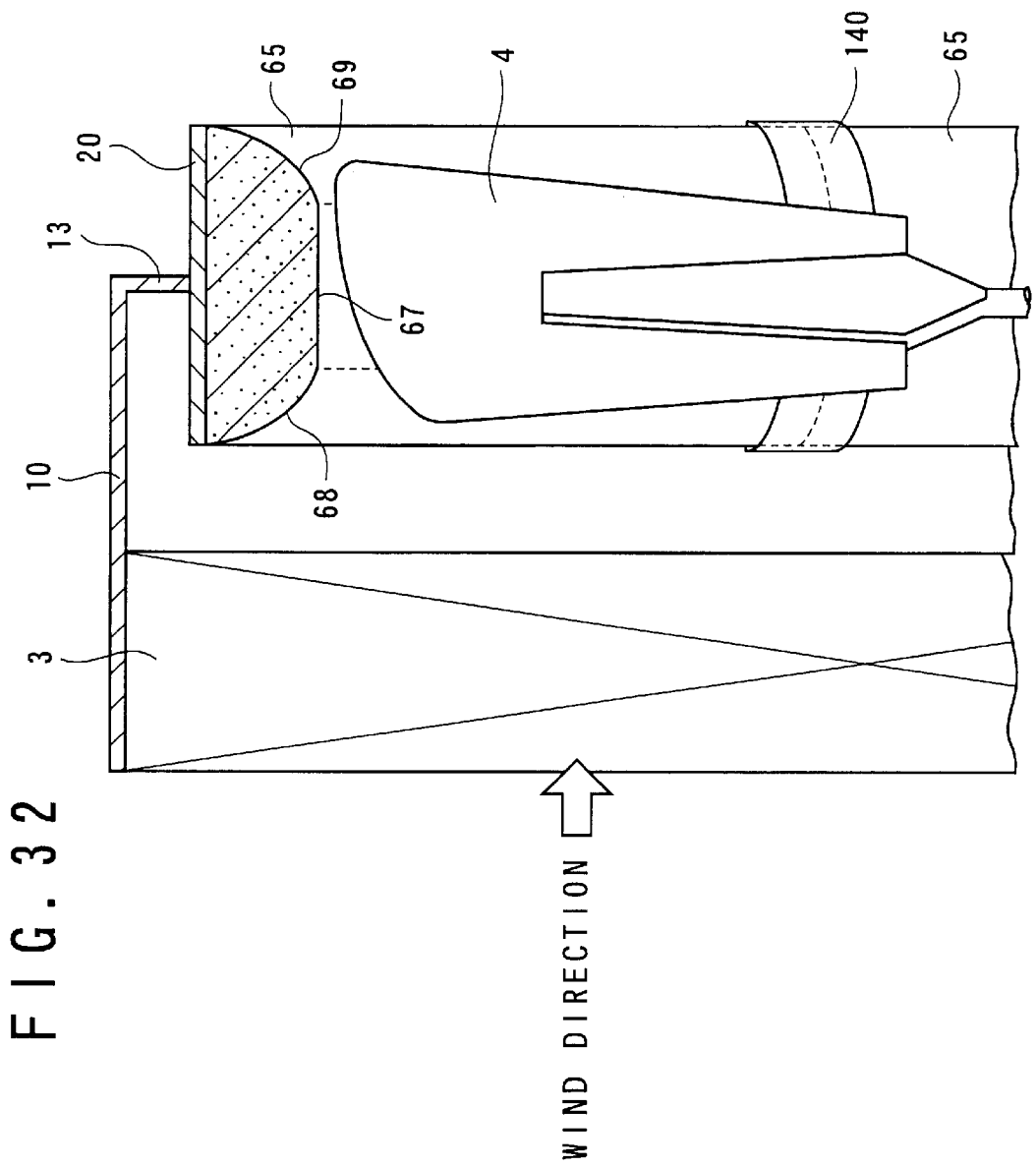
FIG. 32 is a cross section showing the fifteenth modification of the present invention.
Figure 33:
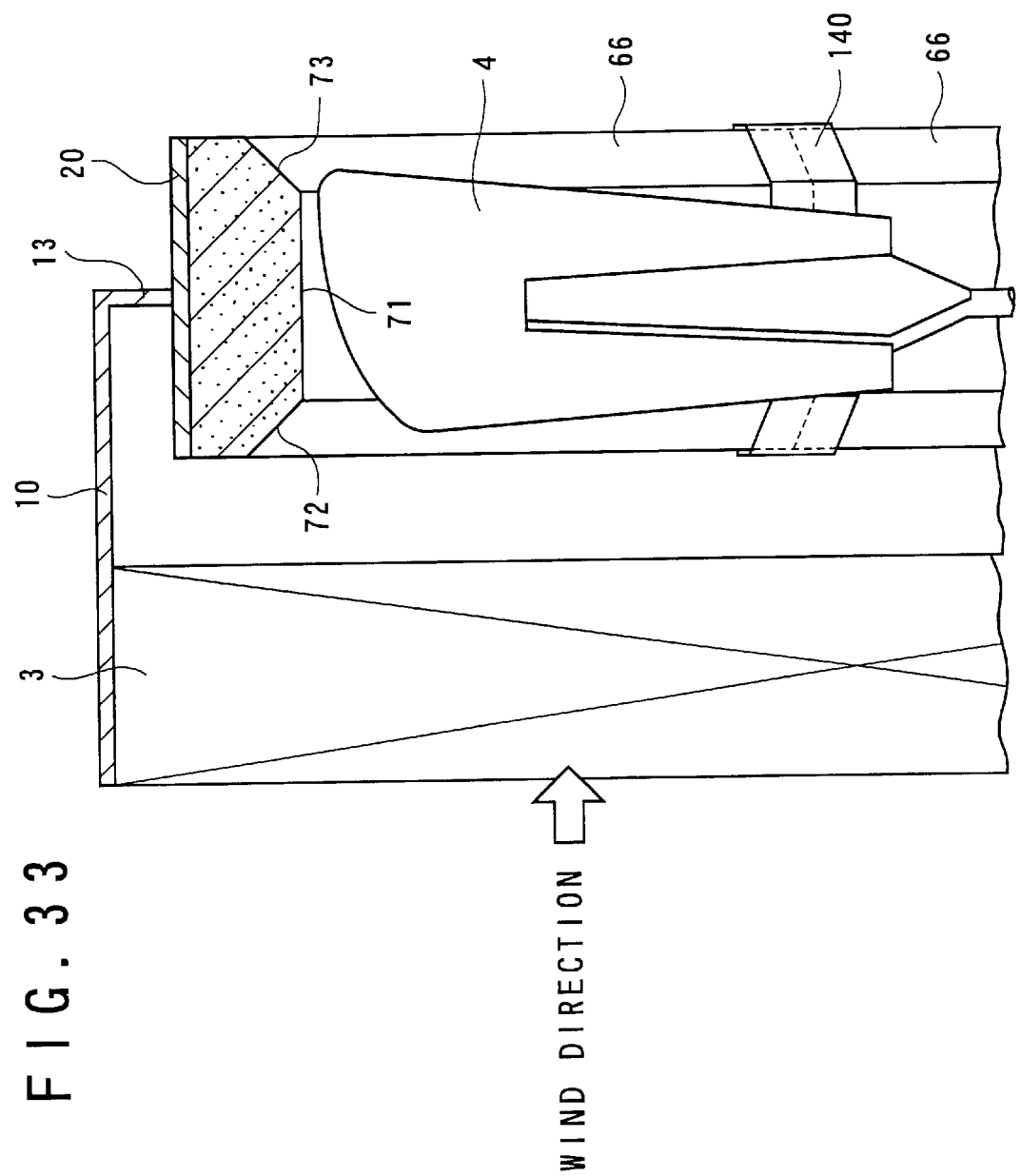
FIG. 33 is a cross section showing the sixteenth modification of the present invention.

Further, the porous member may have cross section as shown in porous members 65 and 66 illustrated in FIGS. 32 and 33 (the fifteenth and sixteenth modifications). In the porous member 65 shown in FIG. 32, a linear portion 67 is formed at the center along the flow direction of the cooling air, and bell-mouth upstream opening 68 and a downstream opening 69 are provided respectively on the upstream side and downstream side thereof. In the porous member 66 shown in FIG. 33, a linear portion 71 is formed at the center along the flow direction of the cooling air, and a linear upstream enlarging portion 72 and a downstream enlarging portion 73 are provided respectively on the upstream side and downstream side thereof.

As in the above-described seventh modification (see FIG. 10), the molding method may be applied to an arrangement where the fan shroud 74 itself is made of porous damping material (seventeenth modification).

Figure 34:
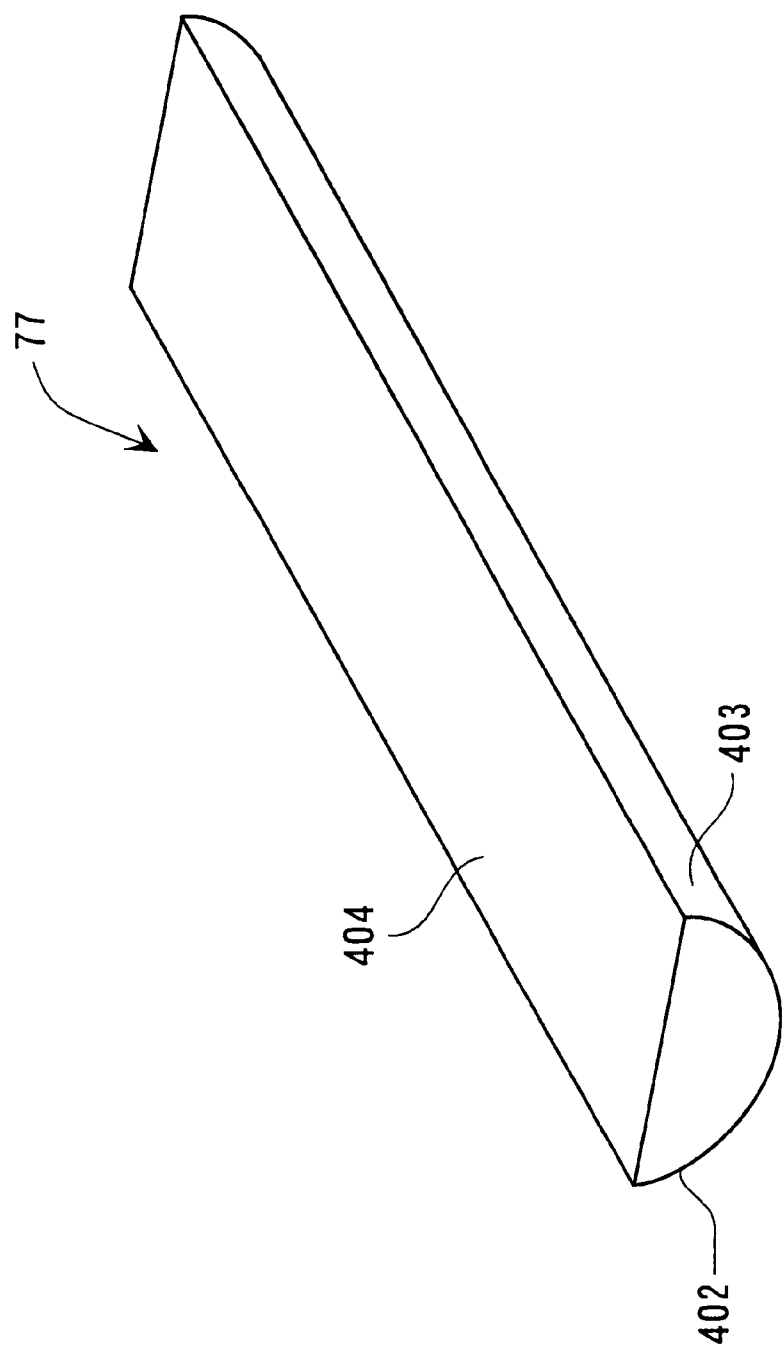
FIG. 34 is an entire cross section showing the eighteenth modification of the present invention.

Though the porous member 401 of the aforesaid thirteenth embodiment is molded in a curved shape having a radius R1, the porous member 401 may be formed in a short linear shape as in the porous member 77 shown in FIG. 34 (the eighteenth modification). Since the porous member 77 with the present configuration is linearly shaped, the porous member 77 can be easily molded in elongated shape, which may be cut in a desired length. Further, since no predetermined radius R1 is not defined unlike the porous member 401 of the aforesaid embodiment, the porous member 77 can be appropriately fitted to fan shrouds having any inner diameter by being curved to be attached.

Further, the arrangement of the porous damping material of the present invention is not limited to be composed of a plurality of porous member, but may be molded in a single continuous elongated porous damping material to be directly attached to the fan shroud.

Figure 35:
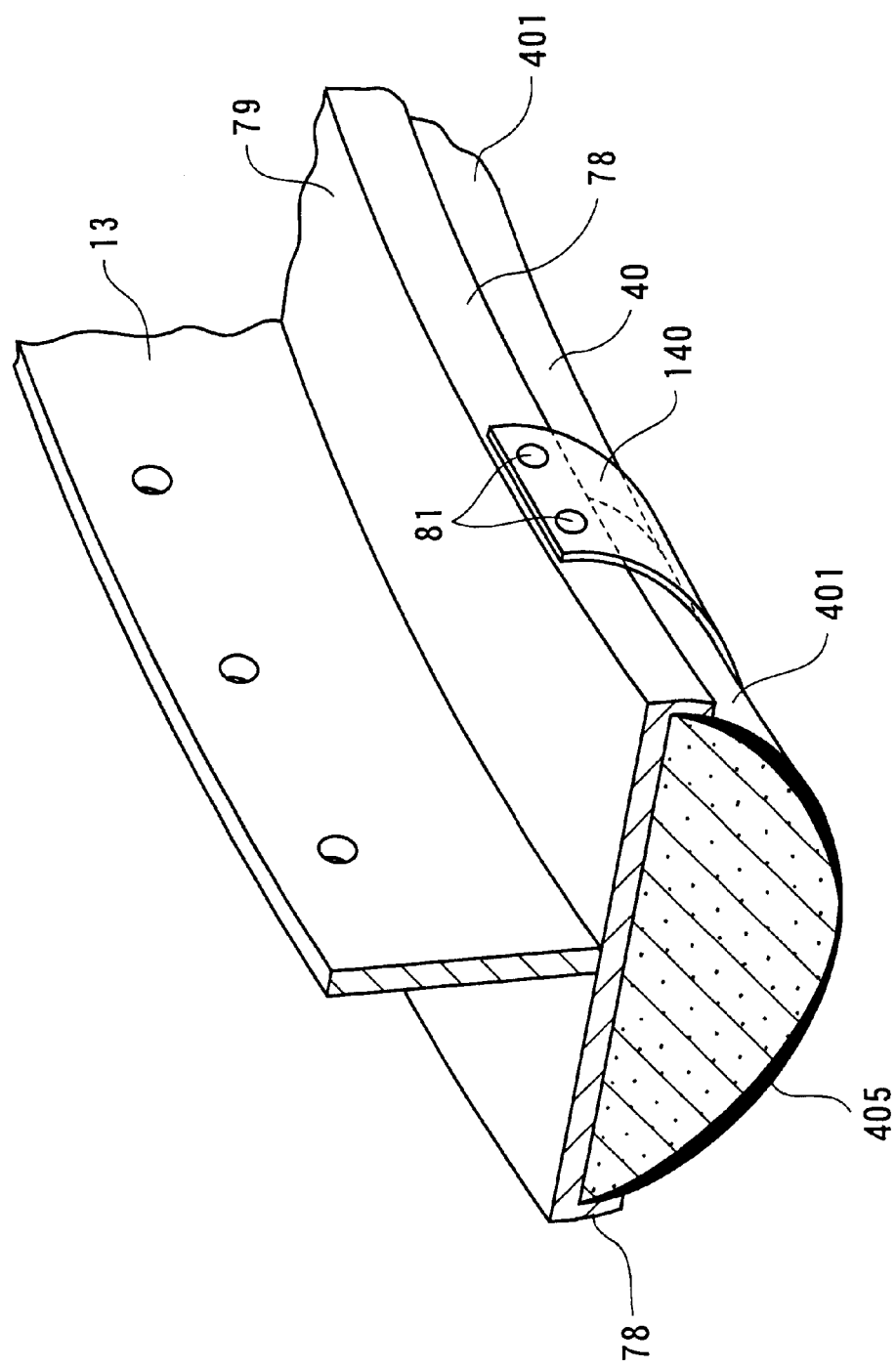
FIG. 35 is a perspective showing the nineteenth modification of the present invention.

Though the belt 140 of the aforesaid embodiment is entirely would around the porous damping material 40 (porous member 401) and the fan shroud 20, when the fan shroud 79 having a fringe along circumference thereof is used as shown in FIG. 35 (the nineteenth modification), the belt 140 may be fixed to the fringe 78 by a joint 81 such as a rivet to prevent the porous damping material 40 from dropping out.

Incidentally, the belt 140 is not only wound to cover the boundary of the adjacent porous member 401, but may be wound around at any position in circumferential direction.

Further, since the fan shroud 89 having the fringe 78 can protect the edge portion along the circumference of the porous member 401 by the fringe 78, the porous member 401 can also be prevented from peeling off.

The dropout prevention member of the present invention may not only be the belt 140 but also be a net 82 shown in FIG. 36 (the twentieth modification). The net 82 is arranged by braiding metal thread etc. in a net and does not cause impulsive sound of the cooling air when the net 82 is provided on the surface of the porous damping material 40. The net 82 can be attached to the fringe 78 etc. of the fan shroud 79 by the joint 81 through a thin attachment member 83 along the circumference.

The porous member 401 of the aforesaid embodiments is molded by packing a predetermined volume of the foam material 406 into the die 150. However, the porous member 401 may be molded by directly feeding a molten resin and a foaming agent into the die while foaming the resin inside the die cavity to mold into the final porous member shape. Though the molding method of the present invention does not include the present method, since the porous member or the porous damping material can be manufactured by die molding, the porous damping material of the present invention includes such an arrangement.

The noise reduction mechanism according to the present invention can be used not only to the engine cooling system of excavator, but also can be used to engine cooling system of special-purpose vehicle including other construction equipment and ordinary automobile, and industrial cooling system such as cooling tower for cooling plant cooling water in various factories. In short, the present invention can be applied not only to a mechanism where the fan is driven by an engine but also to a mechanism having motor-driven fan.

What is claimed is:

1. A noise reduction mechanism of a fan device comprising:

a fan shroud spaced apart from a rotation locus of an end of a rotary fan by a predetermined gap;

a shroud support for supporting the fan shroud; and a porous damping material opposing to the end of the fan, the porous damping material being attached to at least a part of the fan shroud or forming a part of the fan shroud; wherein a number of holes is formed in the fan shroud with the porous damping material being attached.

2. A noise reduction mechanism of a fan device comprising:

a fan shroud spaced apart from a rotation locus of an end of a rotary fan by a predetermined gap;

a shroud support for supporting the fan shroud; and a porous damping material opposing to the end of the fan, the porous damping material being attached to at least a part of the fan shroud or forming a part of the fan shroud; wherein the fan shroud has openings respectively provided on upstream and downstream sides in the air flow direction and curved in bell-mouth shape, and a parallel portion provided between the openings, the parallel portion being parallel to the axis line direction of rotation axis of the fan, and wherein the porous damping material is attached to the parallel portion of the fan shroud.

3. A noise reduction mechanism of a fan device comprising:

a fan shroud spaced apart from a rotation locus of an end of a rotary fan by a predetermined gap;

a shroud support for supporting the fan shroud; and a porous damping material opposing to the end of the fan, the porous damping material being attached to at least a part of the fan shroud or forming a part of the fan shroud; wherein the fan shroud has openings respectively provided on upstream and downstream sides in the air flow direction and curved in bell-mouth shape, and a parallel portion provided between the openings, the parallel portion being parallel to the axis line direction of the rotation axis of the fan, and wherein the porous damping material is attached to the parallel portion of the fan shroud, and the porous damping material is formed in a smooth shroud extending over apart of the bell-mouth shaped opening provided to upstream and downstream sides in the air flow direction.

4. A noise reduction mechanism of a fan device comprising:

a fan shroud spaced apart from a rotation locus of an end of a rotary fan by a predetermined gap;

a radiator provided upstream or downstream of the fan;

a radiator hood and an end plate for air-tightly connecting the radiator and the fan shroud; and a damping chamber constituted of a semi-closed space surrounded by the radiator hood, the end plate and the fan shroud, wherein the damping chamber is in communication with an inside of the radiator hood through a plurality of resonance pipes provided along a circumferential direction of the damping chamber.

5. A noise reduction mechanism of a fan device comprising:

a fan shroud spaced apart from a rotation locus of an end of a rotary fan by a predetermined gap;

a shroud support for supporting the fan shroud; and a porous damping material opposing to the end of the fan, the porous damping material being attached to at least a part of the fan shroud or forming a part of the fan shroud; wherein the porous damping material is a die-molding product, and the porous damping material is constituted of a plurality of porous members along the circumference of the fan shroud.

6. A noise reduction mechanism of a fan device comprising:
- a fan shroud spaced apart from a rotation locus of an end of a rotary fan by a predetermined gap;
- a shroud support for supporting the fan shroud; and
- a porous damping material opposing to the end of the fan, the porous damping material being attached to at least a part of the fan shroud or forming a part of the fan shroud; wherein
- the porous damping material is a die-molding product, and
- the porous damping material is held on the fan shroud and/or the support by a net-shaped dropout prevention means.

7. A molding method of a porous damping material used for a noise damping mechanism of fan device having: a rotary fan; a fan shroud spaced apart from a rotation locus of an end of the rotary fan by a predetermined gap; a shroud support for supporting the fan shroud; and
- a porous damping material opposing to the end of the fan, the porous damping material being attached to at least a part of the fan shroud or forming a part of the fan shroud, the method comprising the steps of:
- disposing a foam material having a larger volume than a volume of a cavity of a die while being elastically deformed; and
- heating only one die to mold the foam material into the porous damping material.

8. A method of producing a molded porous damping material used for a noise damping mechanism of fan device having: a rotary fan; a fan shroud spaced apart from a rotation locus of an end of the rotary fan by a predetermined gap; a shroud support for supporting the fan shroud; and a porous damping material opposing to the end of the fan, the porous damping material being attached to at least a part of the fan shroud or forming a part of the fan shroud, the method comprising the steps of:
- disposing a foam material having larger volume than a cavity of a die while being elastically deformed; and
- heating only one die to mold the foam material into the molded porous damping material constituted of a plurality of porous members provided along the circumference of the fan shroud, the porous damping material being molded by the foam material using the die.

9. A noise reduction mechanism of a fan device comprising:
- a fan shroud spaced apart from a rotation locus of an end of a rotary fan by a predetermined gap;
- a shroud support for supporting the fan shroud; and
- a porous damping material opposing to the end of the fan, the porous damping material being attached to at least a part of the fan shroud or forming a part of the fan shroud, wherein the porous damping material has a cover portion for covering a surface thereof opposing to the end of the fan, said cover portion being an integral part of said porous damping material.

10. The noise reduction mechanism of the fan device according to claim 9, wherein the fan shroud and/or the porous damping material has a bell-mouth shape.

11. The noise reduction mechanism of the fan device according to claim 10, wherein the fan shroud has a protector for protecting at least one of an upstream end and a downstream end of the porous damping material in an air flow direction.

12. The noise reduction mechanism of the fan device according to claim 11, wherein the fan shroud has an engage member for partially engaging the porous damping material.

13. The noise reduction mechanism of the fan device according to claim 12, wherein the fan shroud has openings respectively provided on upstream and downstream sides in the air flow direction and curved in a bell-mouth shape, and a parallel portion provided between the openings, the parallel portion being parallel to the axis line direction of rotation axis of the fan, and wherein the porous damping material is attached to the parallel portion of the fan shroud.

14. The noise reduction mechanism of the fan device according to claim 9, further comprising a radiator provided upstream or downstream of the fan, a radiator hood and an end plate, the radiator hood and the end plate air-tightly connecting the radiator and the fan shroud.

15. The noise reduction mechanism of the fan device according to claim 14, wherein another porous damping material is attached to an inner circumference of the radiator hood and/or an inner circumference of the end plate.

16. The noise reduction mechanism of the fan device according to claim 9, wherein a number of holes is formed in the fan shroud with the porous damping material being attached.

17. A noise reduction mechanism of a fan device comprising:
- a fan shroud spaced apart from a rotation locus of an end of a rotary fan by a predetermined gap;
- a shroud support for supporting the fan shroud; and
- a porous damping material opposing to the end of the fan, the porous damping material being attached to at least a part of the fan shroud or forming a part of the fan shroud, wherein the porous damping material is a die-molding product having portions of the surface of the porous damping material melted and solidified from a die-molding process.

18. The noise reduction mechanism of the fan device according to claim 17, wherein the porous damping material is formed linearly in a longitudinal direction thereof and is curved along the circumference of the fan shroud.

19. The noise reduction mechanism of the fan device according to claim 17, wherein the porous damping material is curved in a longitudinal direction thereof and is provided along the circumference of the fan shroud.

20. The noise reduction mechanism of the fan device according to claim 18, wherein the porous damping material is constituted of a plurality of porous members provided along the circumference of the fan shroud.

21. The noise reduction mechanism of the fan device according to claim 19, wherein a configuration the porous damping material is constituted of a plurality of porous members provided along the circumference of the fan shroud.

22. The noise reduction mechanism of the fan device according to claim 17, wherein a configuration of the porous damping material confronting the end of the fan is a bell-mouth shape on both an upstream side and a downstream side of the fan shroud.

23. A noise reduction mechanism of a fan device comprising:
- a fan shroud spaced apart from a rotation locus of an end of a rotary fan by a predetermined gap;
- a shroud support for supporting the fan shroud; and a porous damping material opposing to the end of the fan, the porous damping material being attached to at least a part of the fan shroud or forming a part of the fan shroud, wherein the fan shroud has a cylindrical shape and the porous damping material is attached to the fan shroud, the porous damping material being formed in a bell-mouth shape in both of an upstream side and a downstream side in an air flow direction, and the porous damping material is held on the fan shroud and/or the shroud support by a belt-shaped dropout prevention means.

24. A noise reduction mechanism of a fan device comprising:

a fan shroud spaced apart from a rotation locus of an end of a rotary fan by a predetermined gap;

a shroud support for supporting the fan shroud; and a porous damping material opposing to the end of the fan, the porous damping material being attached to at least a part of the fan shroud or forming a part of the fan shroud, wherein the fan shroud has a cylindrical shape and the porous damping material is attached to the fan shroud, the porous damping material being formed in a bell-mouth shape in both of an upstream side and a downstream side in an air flow direction, and the porous damping material is held on the fan shroud and/or the support by a net-shaped dropout prevention means.

* * * * *